US007365291B2

(12) United States Patent
Lee et al.

(10) Patent No.: US 7,365,291 B2
(45) Date of Patent: Apr. 29, 2008

(54) HIGH VOLTAGE INPUT APPARATUS FOR MAGNETRON

(75) Inventors: Yong Soo Lee, Kyungki-do (KR); Jong Soo Lee, Kyungki-do (KR)

(73) Assignee: LG Electronics Inc., Seoul (KR)

(*) Notice: Subject to any disclaimer, the term of this patent is extended or adjusted under 35 U.S.C. 154(b) by 716 days.

(21) Appl. No.: 10/978,485

(22) Filed: Nov. 2, 2004

(65) Prior Publication Data

US 2005/0141585 A1 Jun. 30, 2005

(30) Foreign Application Priority Data

Dec. 30, 2003 (KR) ...................... 10-2003-0100241

(51) Int. Cl.
*H05B 6/70* (2006.01)
*H01G 4/00* (2006.01)

(52) U.S. Cl. ...................... 219/697; 219/690; 219/702; 219/746; 361/301.1; 361/302

(58) Field of Classification Search ................ 219/690, 219/697, 702, 736–738, 746, 748, 743; 361/301.1, 361/302, 306.1–310
See application file for complete search history.

(56) References Cited

U.S. PATENT DOCUMENTS

| | | | | |
|---|---|---|---|---|
| 4,811,161 | A | 3/1989 | Sasaki et al. | |
| 5,032,949 | A | 7/1991 | Sasaki et al. | |
| 5,113,309 | A | 5/1992 | Sasaki et al. | |
| 5,451,752 | A * | 9/1995 | Jun et al. | 219/761 |
| 5,600,531 | A * | 2/1997 | Jun | 361/302 |
| 6,510,038 | B1 | 1/2003 | Satou et al. | |
| 6,819,541 | B2 | 11/2004 | Hong | |
| 2002/0180363 | A1 | 12/2002 | Murao et al. | |
| 2003/0147195 | A1 * | 8/2003 | Hong | 361/301.1 |

FOREIGN PATENT DOCUMENTS

| | | |
|---|---|---|
| EP | 0348689 | 1/1990 |
| EP | 1263016 | 12/2002 |
| JP | 63-139752 | 9/1988 |
| JP | 2-038725 | 3/1990 |
| JP | 2003-242899 | 8/2003 |

OTHER PUBLICATIONS

U.S. Appl. No. 10/978,347 to Seung Won Baek et al., filed Nov. 2, 2004.
English Language Abstract of JP 2003-242899. Jun. 12, 2002.

* cited by examiner

*Primary Examiner*—Tuyet Vo
(74) *Attorney, Agent, or Firm*—Greenblum & Bernstein, P.L.C.

(57) ABSTRACT

A high voltage input apparatus for a magnetron, in which first protrusions formed on lead conductors are caught by insulators and an insulating case, a ground metal is bonded to the insulating case, and expanded portions formed on the insulators are caught by the insulating case and the ground metal, thereby firmly fixing the lead conductors and preventing the lead conductors from being undesirably separated from the insulators and the insulating case.

22 Claims, 24 Drawing Sheets

HIGH VOLTAGE INPUT APPARATUS FOR MAGNETRON

BACKGROUND OF THE INVENTION

1. Field of the Invention

The present invention relates to a high voltage input apparatus for a magnetron, which inputs a high voltage to the magnetron, and more particularly to a high voltage input apparatus for a magnetron, in which lead conductors for inputting a high voltage to the magnetron therethrough are caught by both sides of the high voltage input apparatus in a longitudinal direction for preventing the lead conductors from being undesirably separated from the apparatus.

2. Description of the Related Art

Generally, magnetrons are apparatuses for generating and outputting microwaves, installed in a microwave oven or etc., and include a high voltage input apparatus for inputting high voltage therethrough.

FIG. 1 is a cross-sectional view of a conventional magnetron. The conventional magnetron comprises an anode unit including vanes 12 and straps 13 forming a resonance circuit when anode voltage and anode current having constant quantities are applied to the magnetron, a cathode unit 14 placed inside the anode unit for generating a large quantity of thermal electrons and generating microwaves in a space where the cathode unit 14 acts with ends of the vanes 12, an antenna 15 for transmitting the microwaves generated in the acting space to the outside, a plurality of cooling pins 16 installed on the outer periphery of the anode unit for radiating heat converted from residual energy, which is not transformed into the microwaves, yokes 17 and 18 for protecting and supporting the anode unit and the cooling pins 16 and guiding external air to the cooling pins 16, upper and lower permanent magnets 19 and 20 respectively placed on lower and upper surfaces of the yokes 17 and 18 for constituting a closed magnetic circuit, a filter case 22 including an LC filter 21 for removing high-frequency radiation noise, and a high voltage input apparatus 23 installed on the filter case 22 for inputting high voltage to the magnetron therethrough.

The anode unit includes an anode main body 11 having a cylindrical shape, a plurality of the vanes 12 installed in the anode main body 11, and the straps 13 passing through the vanes 12 for constituting the resonance circuit between the vanes 12 and the straps 13.

FIG. 2 is a cross-sectional view of a high voltage input apparatus for the conventional magnetron.

As shown in FIG. 2, the high voltage input apparatus 23 comprises a pair of lead conductors 24 and 25, hollow insulating tubes 26 and 27 respectively surrounding the lead conductors 24 and 25, and a ground metal 28, through which the insulating tubes 26 and 27 pass, fixed to the filter case 22 by a locking bolt.

The above-described high-output magnetron generates microwaves, i.e., high-frequency waves, and transmits the microwaves to a system. When high voltage is inputted to the magnetron through the lead conductors 24 and 25 of the high voltage input apparatus 23, anode voltage and anode current having designated quantities are applied to the anode main body 11 and a resonance circuit is formed by the vanes 12 and the straps 13 inside the anode main body 11 sealed in a vacuum state. When the resonance circuit is formed, microwaves are generated in the acting space, which is formed between the ends of the vanes 12 and the cathode unit 14, i.e., a filament, and are transmitted to the system through the antenna 15.

Since the lead conductors 24 and 25 are easily separated from the high voltage input apparatus and the insulating tubes 26 and 27 move, the high voltage input apparatus for the conventional magnetron is disadvantageous in that the insulating tubes 26 and 27 need to be firmly fixed and the lead conductors 24 and 25 are easily damaged and separated from the main body of the apparatus when external force is applied to the high voltage input apparatus.

SUMMARY OF THE INVENTION

Therefore, the present invention has been made in view of the above problems, and it is an object of the present invention to provide a high voltage input apparatus for a magnetron, which prevents lead conductors from being undesirably separated from a main body of the apparatus.

It is another object of the present invention to provide a high voltage input apparatus for a magnetron, which is simply and firmly assembled.

It is yet another object of the present invention to provide a high voltage input apparatus for a magnetron, which minimizes the outflow of high frequency waves generated when the magnetron is operated.

In accordance with one aspect of the present invention, the above and other objects can be accomplished by the provision of a high voltage input apparatus for a magnetron, comprising: a pair of lead conductors including lead taps and first protrusions; insulators hollowed to pass the lead conductors in a longitudinal direction and including expanded portions having an increased thickness and grooves for receiving the first protrusions; an insulating case including a tub unit accommodating the expanded portions, and a plate unit having first through holes for catching the first protrusions or the expanded portions and passing the lead taps; and a ground metal, bonded to the tub unit, including second through holes for passing portions of the insulators other than the expanded portions.

Preferably, the ground metal may include a groove unit, into which the tub unit is inserted by press fit.

Further, preferably, hooks may be formed on the tub unit of the insulating case; and holes for passing and catching the hooks may be formed through the ground metal.

In accordance with another aspect of the present invention, there is provided a high voltage input apparatus for a magnetron, comprising: a pair of lead conductors including lead taps and first protrusions; insulators hollowed to pass the lead conductors in a longitudinal direction and including expanded portions having an increased thickness and grooves for receiving the first protrusions; an insulating case including a tub unit accommodating the expanded portions and having a second protrusion, and a plate unit having first through holes for catching the first protrusions or the expanded portions and passing the lead taps; a ground metal including second through holes for passing portions of the insulators other than the expanded portions; and a filter case including a third through hole for passing the tub unit of the insulating case, and causing the second protrusion to be caught thereby and the ground metal to be mounted thereon.

Preferably, the ground metal may include a plate body unit contacting the filter case, and a receipt unit formed in the plate body in a stepwise manner for receiving the second protrusion; and the second protrusion, when the second protrusion is received by the receipt unit, may be coplanar with the plate body unit.

Further, preferably, hooks may be formed on the second protrusion; and holes for passing and catching the hooks may be formed through the receipt unit.

Moreover, preferably, the grooves may indent ends of the expanded portions in a longitudinal direction; and a high-frequency absorber may be interposed between the expanded portions and the plate unit of the insulating case.

In accordance with yet another aspect of the present invention, there is provided a high voltage input apparatus for a magnetron, comprising: a pair of lead conductors including lead taps and first protrusions; a high-frequency absorber including first through holes for respectively passing the lead conductors and grooves for catching the first protrusions; insulators hollowed to pass the lead conductors in a longitudinal direction and including expanded portions having an increased thickness; an insulating case including a tub unit accommodating the high-frequency absorber and the expanded portions, and a plate unit having second through holes for catching the high-frequency absorber or the first protrusions and passing the lead taps; and a ground metal including a third through hole, bonded to the tub unit, for passing portions of the insulators other than the expanded portions.

Preferably, the ground metal may include a groove unit, into which the tub unit is inserted by press fit.

Further, preferably, hooks may be formed on the tub unit; and holes for passing and catching the hooks may be formed through the ground metal.

Moreover, preferably, the second protrusion may be formed on the tub unit; and the high voltage input apparatus may further comprise a filter case including a fourth through hole for passing the tub unit of the insulating case, and causing the second protrusion to be caught thereby.

Preferably, the ground metal may include a plate body unit contacting the filter case, and a receipt unit formed in the plate body in a stepwise manner for receiving the second protrusion; and the second protrusion, when the second protrusion is received by the receipt unit, may be coplanar with the plate body unit.

Further, preferably, the high voltage input apparatus may further comprise metal guides respectively inserted into the insulators such that parts of the insulators are interposed between the lead conductors, and connected to the ground metal.

Moreover, preferably, a high-frequency absorber may be interposed between the ground metal and the expanded portions.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the annexed drawings.

Figure 1:
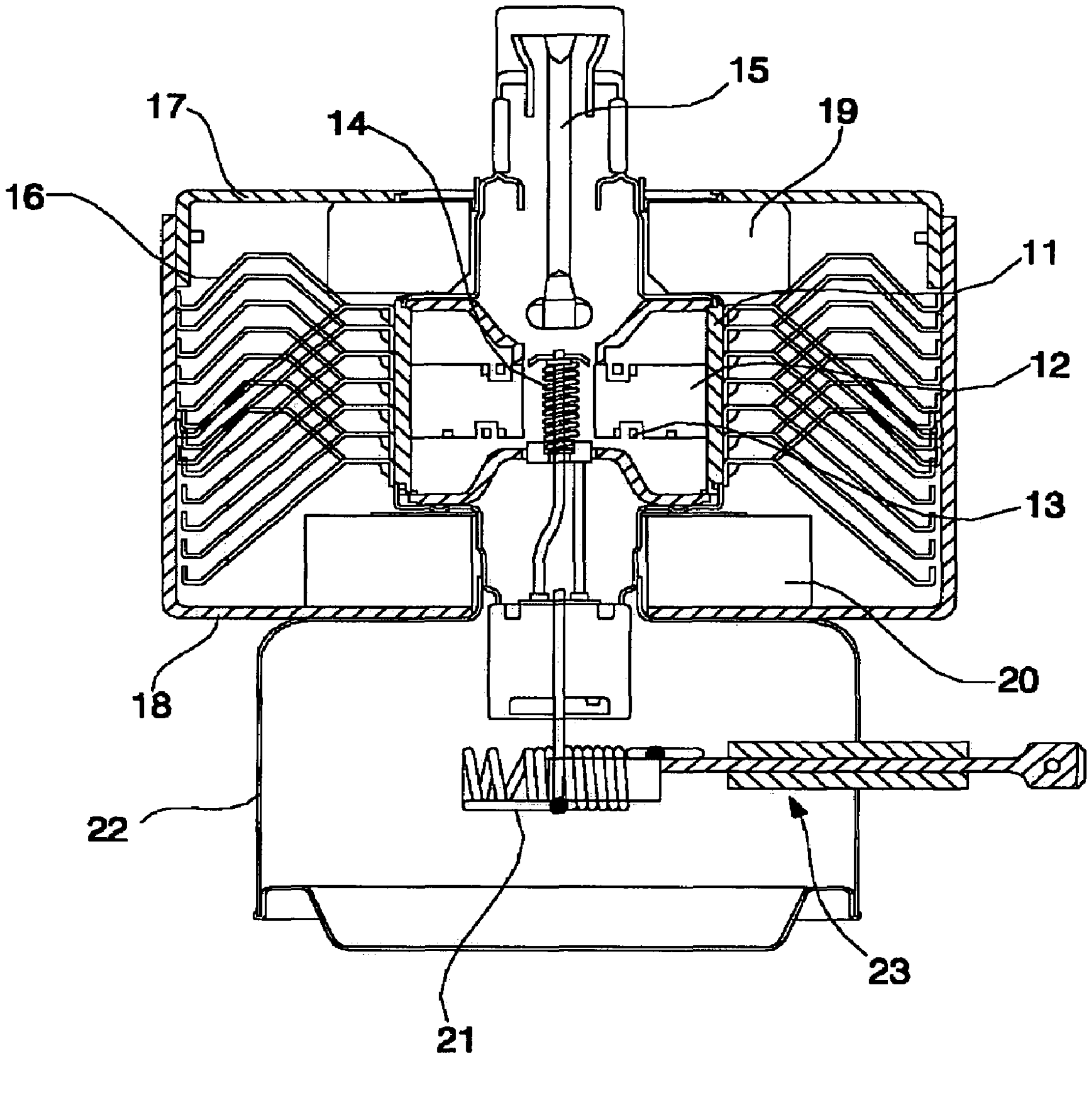
FIG. 1 (Prior Art)
FIG. 1 is a cross-sectional view of a conventional magnetron.
Figure 2:
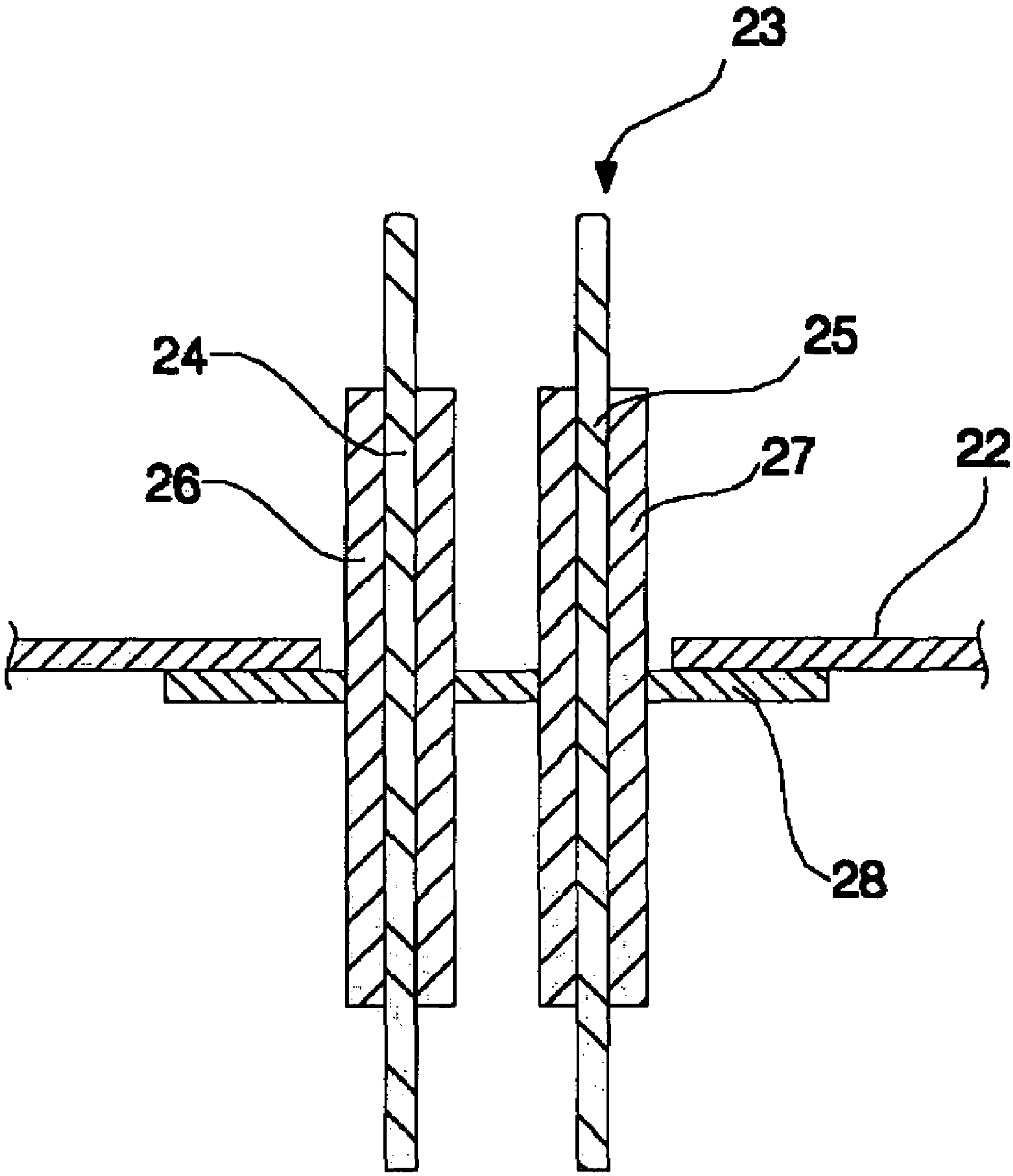
FIG. 2 (Prior Art)
FIG. 2 is a cross-sectional view of a high voltage input apparatus for the conventional magnetron.
Figure 3:
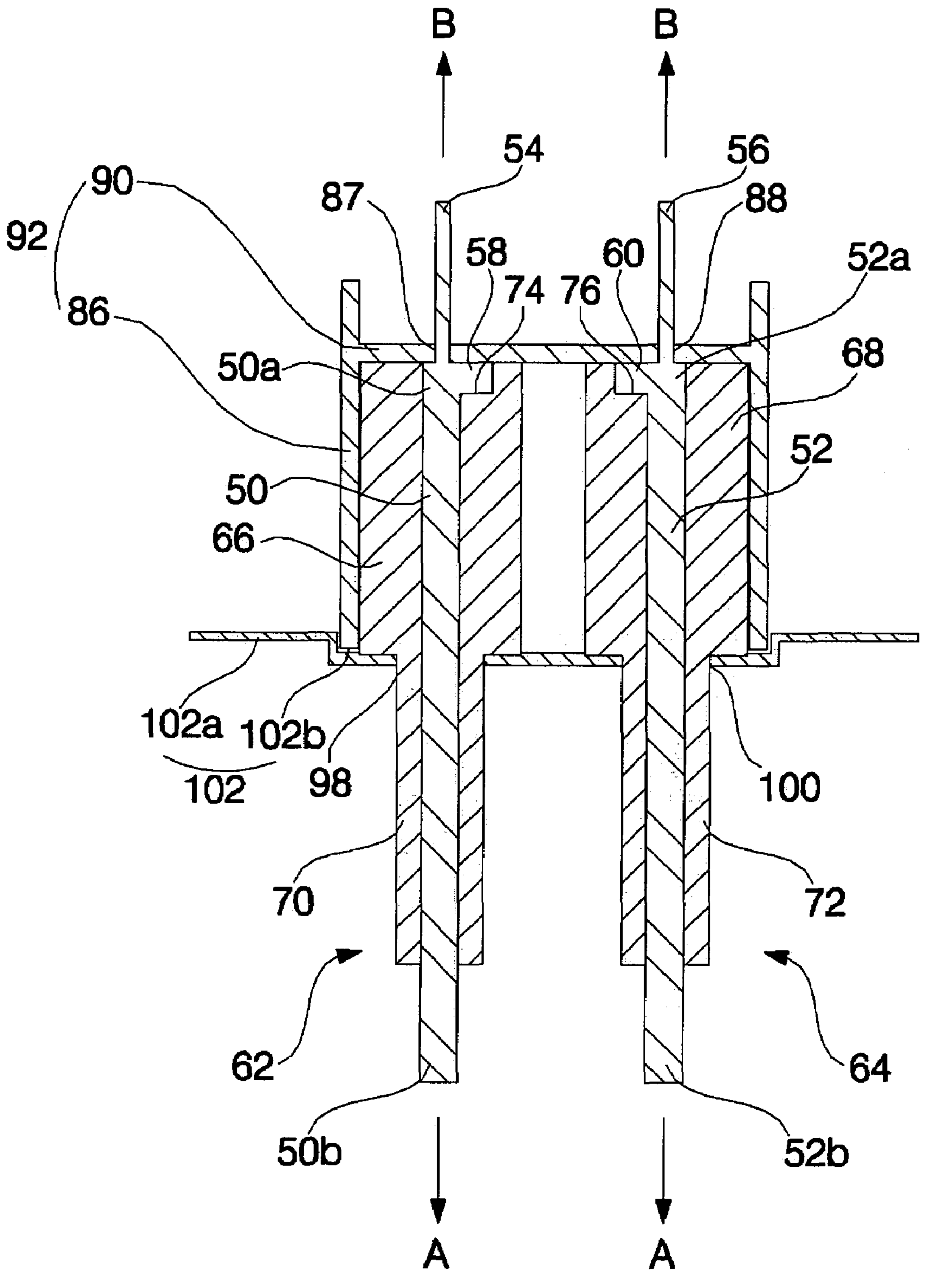
FIG. 3 is a cross-sectional view of a high voltage input apparatus for a magnetron in accordance with a first embodiment of the present invention.
Figure 4:
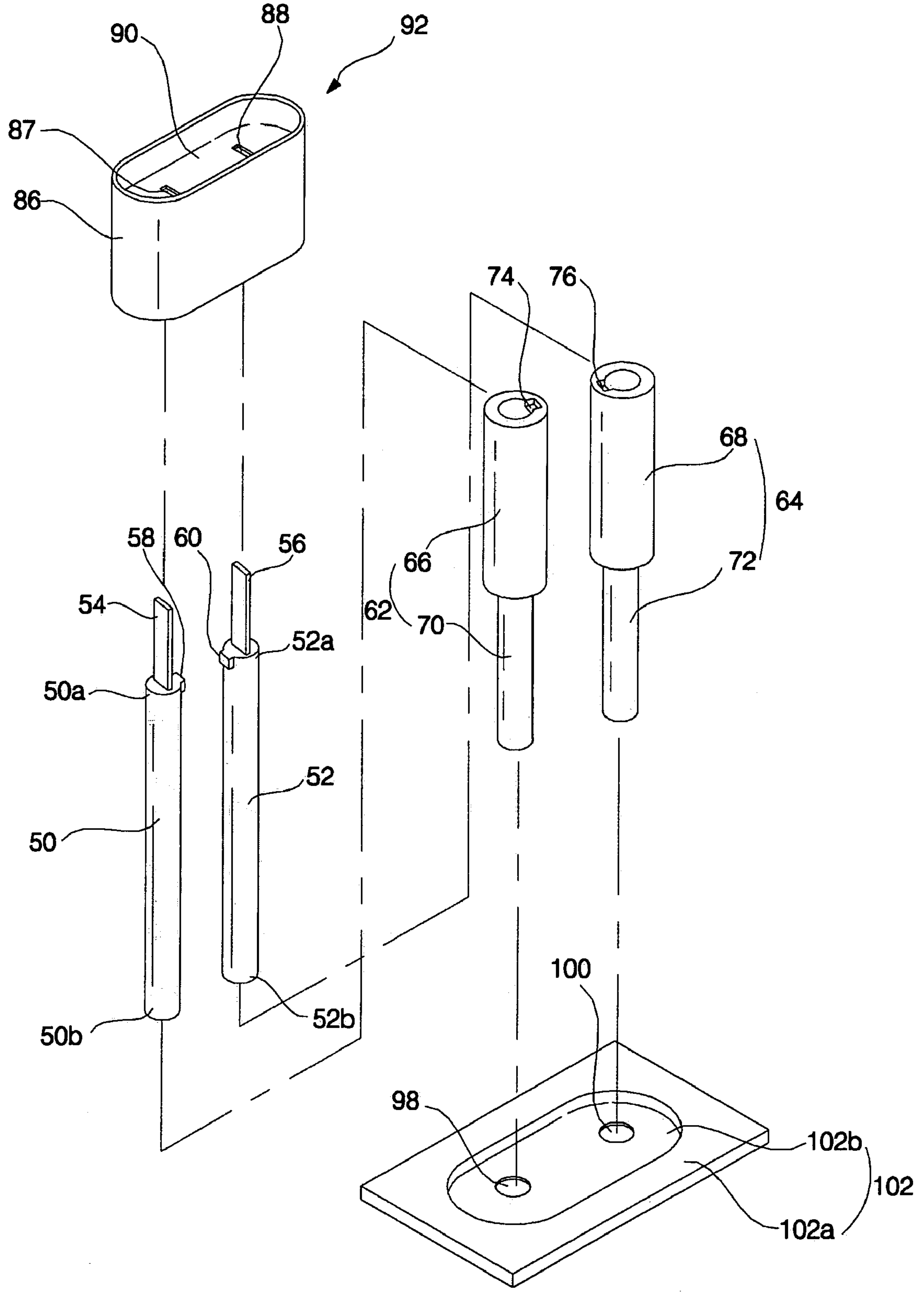
FIG. 4 is an exploded perspective view of the high voltage input apparatus in accordance with the first embodiment of the present invention.

FIG. 3 is a cross-sectional view of a high voltage input apparatus for a magnetron in accordance with a first embodiment of the present invention, and FIG. 4 is an exploded perspective view of the high voltage input apparatus in accordance with the first embodiment of the present invention.

As shown in FIGS. 3 and 4, the high voltage input apparatus in accordance with the first embodiment comprises a pair of lead conductors 50 and 52 including lead taps 54 and 56 respectively formed thereon and first protrusions 58 and 60 respectively formed thereon.

The lead conductors 50 and 52 have a rod shape, and the lead taps 54 and 56 are protruded from ends 50*a* and 52*a* of the lead conductors 50 and 52 in a longitudinal direction and have a square pillar shape.

The first protrusions 58 and 60 are protruded from the side surfaces of the ends 50*a* and 52*a* of the lead conductors 50 and 52, from which the lead taps 54 and 56 are protruded, in the direction of thickness.

The first protrusions 58 and 60 may be protruded from the whole peripheries of the lead conductors 50 and 52 such that the first protrusions 58 and 60 have a disk shape. Preferably, the first protrusions 58 and 60 are protruded from parts of the whole peripheries of the lead conductors 50 and 52 so that the first protrusions 58 and 60 are fixed to insulators 62 and 64, which will be described later, in a rotational direction.

A pair of the lead conductors 50 and 52 serve to apply high voltage to the magnetron, and are made of metal and surrounded by the insulators 62 and 64.

The insulators 62 and 64 are made of epoxy resin, which surrounds the lead conductors 50 and 52, and have a sufficient withstand voltage. One insulator, through which the lead conductors 50 and 52 pass, can be installed, and the above two insulators 62 and 64, through which the lead conductors 50 and 52 respectively pass, can be installed such that the two insulators 62 and 64 are separated from each other.

In case that one insulator is installed, it is possible to prevent the lead conductors 50 and 52 from being shaken without any separate structure. In case that the two insulators 62 and 64, which are separated from each other, are installed, it is possible to reduce the cost of materials for an interval between the insulators 62 and 64. Hereinafter, for convenience of description, the two insulators 62 and 64 are used.

The insulators 62 and 64 are hollowed such that the lead conductors 50 and 52 respectively pass through the insulators 62 and 64 in a longitudinal direction.

Expanded portions 66 and 68 having an increased thickness are respectively formed at designated portions of the insulators 62 and 64.

The expanded portions 66 and 68 are expanded from other portions 70 and 72 of the insulators 62 and 64 (referred to as "contracted portions") in a stepwise structure.

That is, the inner diameters of the expanded portions 66 and 68 are the same as the inner diameters of the contracted portions 70 and 72, and the outer diameters of the expanded portions 66 and 68 differ from the outer diameters of the contracted portions 70 and 72.

Grooves 74 and 76, by which the first protrusions 58 and 60 are caught in the downward direction (A) of the lead conductors 50 and 52, are formed on ends of the expanded portions 66 and 68.

In case that the first protrusions 58 and 60 have a disk shape, the grooves 74 and 76 have a disk shape such that the first protrusions 58 and 60 are fixedly inserted into the grooves 74 and 76, and in case that the first protrusions 58 and 60 have a designated shape protruded from parts of the whole peripheries of the lead conductors 50 and 52, the grooves 74 and 76 have the same shape as that of the first protrusions 58 and 60 such that the first protrusions 58 and 60 are inserted into the grooves 74 and 76 and are then caught by the grooves 74 and 76 in the direction of rotation.

The insulators 62 and 64 have a length shorter than that of the lead conductors 50 and 52 so that the lead taps 54 and 56 and the other ends 50*b* and 52*b* of the lead conductors 50 and 52 opposite to the lead taps 54 and 56 are exposed to the outside when the lead conductors 50 and 52 pass through the insulators 62 and 64.

That is, when the lead conductors 50 and 52 are inserted into the insulators 62 and 64, the first protrusions 58 and 60 are caught by the grooves 74 and 76, thereby preventing the lead conductors 50 and 52 from being excessively inserted into the insulators 62 and 64 or from being separated from the insulators 62 and 64, and causing the lead taps 54 and 56 and the ends 50*b* and 52*b* of the lead conductors 50 and 52, opposite to the lead taps 54 and 56, to be surrounded by the insulators 62 and 64.

The high voltage input apparatus further comprises an insulating case 92 including a tub unit 86, into which the expanded portions 66 and 68 are inserted, and a plate unit 90, by which the first protrusions 58 and 60 or the expanded portions 66 and 68 are caught in the upward direction (B), provided with first through holes 87 and 88 for passing the lead taps 54 and 56.

At least one part of the inner surface of the tub unit 86 has a shape corresponding to the shape of one part of the outer peripheries of the expanded portions 66 and 68 so that the outer peripheries of the expanded portions 66 and 68 contact the inner surface of the tub unit 86.

The plate unit 90 is formed integrally with one end of the inner circumference of the tub unit 86.

The high voltage input apparatus further comprises a ground metal 102 including a groove unit 102*b*, into which the second protrusion 82 is inserted by press fit, bonded to the insulating case 92, and second through holes 98 and 100, through which the contracted portions 70 and 72 of the insulators 62 and 64 pass, fixing the expanded portions 66 and 68 thereto in the downward direction (A).

The ground metal 102 includes a plate body unit 102*a*, and the groove unit 102*b* formed in the plate body unit 102*a*, into which the tub unit 86 is inserted by press fit. The groove unit 102*b* has the same size as that of the tub unit 86 so that the tub unit 86 is inserted into the groove unit 102*b* by press fit.

Hereinafter, an assembling process of the above-described high voltage input apparatus will be described in detail.

When the lead conductors 50 and 52 are respectively inserted into the insulators 62 and 64, the first protrusions 58 and 60 of the lead conductors 50 and 52 are caught by the grooves 74 and 76 of the insulators 62 and 64, and the lead taps 54 and 56 and the ends 50*b* and 52*b* of the lead conductors 50 and 52 opposite to the lead taps 54 and 56 are exposed to the outside of the insulators 62 and 64.

Then, when the expanded portions 66 and 68 of the insulators 62 and 64 and the lead conductors 54 and 56 are inserted into the tub unit 86 of the insulating case 92 and the lead taps 54 and 56 of the lead conductors 50 and 52 pass through the first through holes 87 and 88 formed through the plate unit 90 of the insulating case 92, the ends 50*a* and 52*a* of the lead conductors 50 and 52, from which the lead taps 54 and 56 are protruded, and the first protrusions 58 and 60, are fixed to one end of the plate unit 90 of the insulating case 92 in the upward direction (B), and ends of the expanded portions 66 and 68 of the insulators 62 and 64 are fixed to one surface of the plate unit 90 of the insulating case 92 in the upward direction (B).

Under the above state, when the ends 50*b* and 52*b* of the lead conductors 50 and 52, opposite to the lead taps 54 and 56, and the contracted portions 70 and 72 of the insulators 62 and 64, pass through the second through holes 98 and 100 of the ground metal 102, and the tub unit 86 is inserted into the groove unit 102*b* of the ground metal 102 by press fit, the insulating case 92 is fixed to the ground metal 102 by press fit, and the expanded portions 66 and 68 of the insulators 62 and 64 are surrounded by the tub unit 86 and the plate unit 90 of the insulating case 92 and the ground metal 102, and caught by the plate unit 90 and the ground metal 102 respectively in the upward direction (B) and the downward direction (A).

When the lead taps 54 and 56 of the lead conductors 50 and 52 or the insulating case 92 of the above-assembled high voltage input apparatus are drawn in the upward direction (B), the ends 50*a* and 52*a* of the lead conductors 50 and 52 provided with the lead taps 54 and 56 and the first protrusions 58 and 60 are caught by one surface of the plate unit 90 of the insulating case 92 in the upward direction (B), thereby being prevented from being separated from the plate unit 90. Further, the tub unit 86 of the insulating case 92 is inserted into the ground metal 102, thereby being prevented from being separated from the ground metal 102.

On the other hand, when the ends 50*b* and 52*b* of the lead conductors 50 and 52, opposite to the lead taps 54 and 56, are drawn in the downward direction (A), the first protrusions 58 and 60 of the lead conductors 50 and 52 are caught by the grooves 74 and 76 of the insulators 62 and 64 in the downward direction (A) and the expanded portions 66 and 68 of the insulators 62 and 64 are caught by the ground metal 102 in the downward direction (A). Thereby, the lead conductors 50 and 52 are prevented from being separated from the insulators 62 and 64, and the insulators 62 and 64 are prevented from being separated from the ground metal 102.

Figure 5:
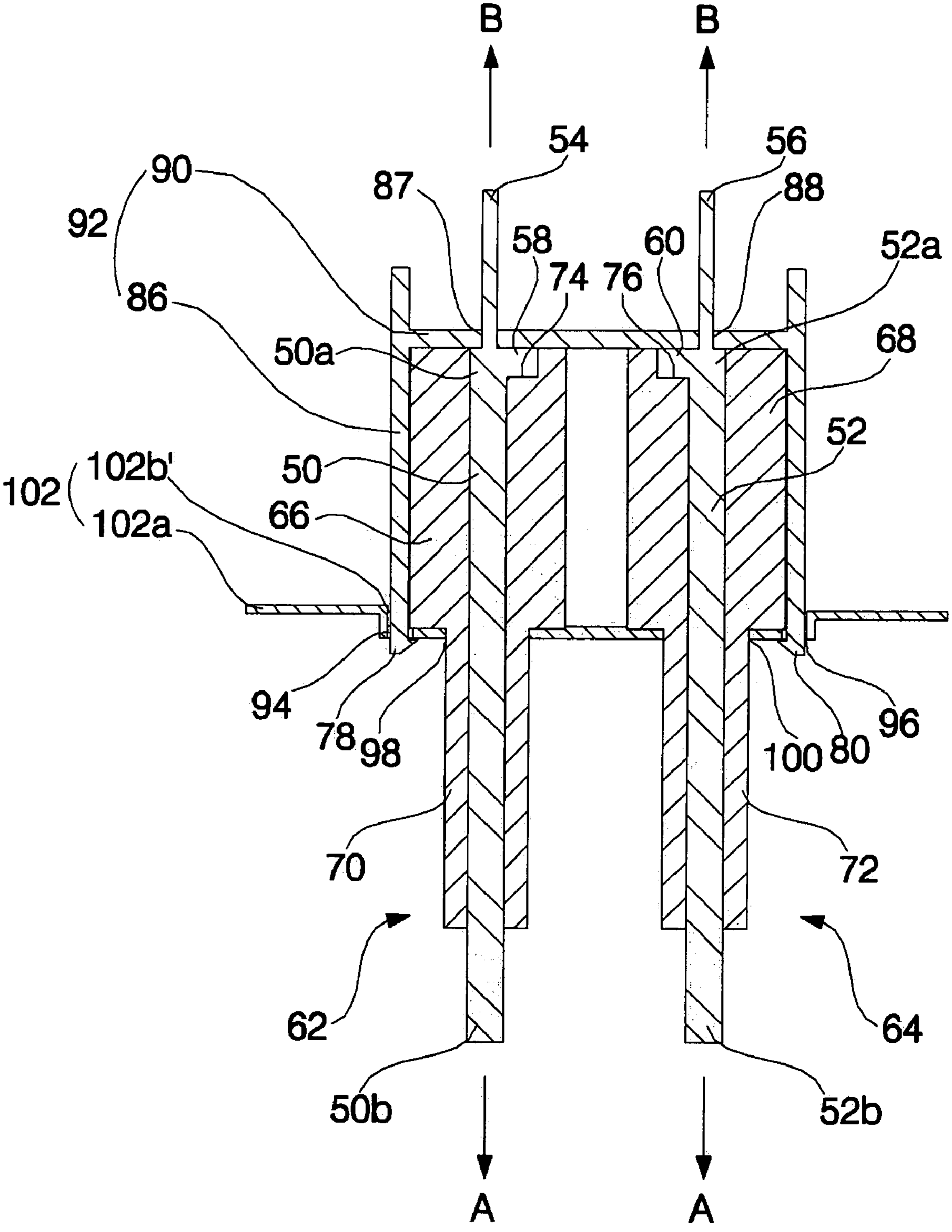
FIG. 5 is a cross-sectional view of a high voltage input apparatus for a magnetron in accordance with a second embodiment of the present invention.
Figure 6:
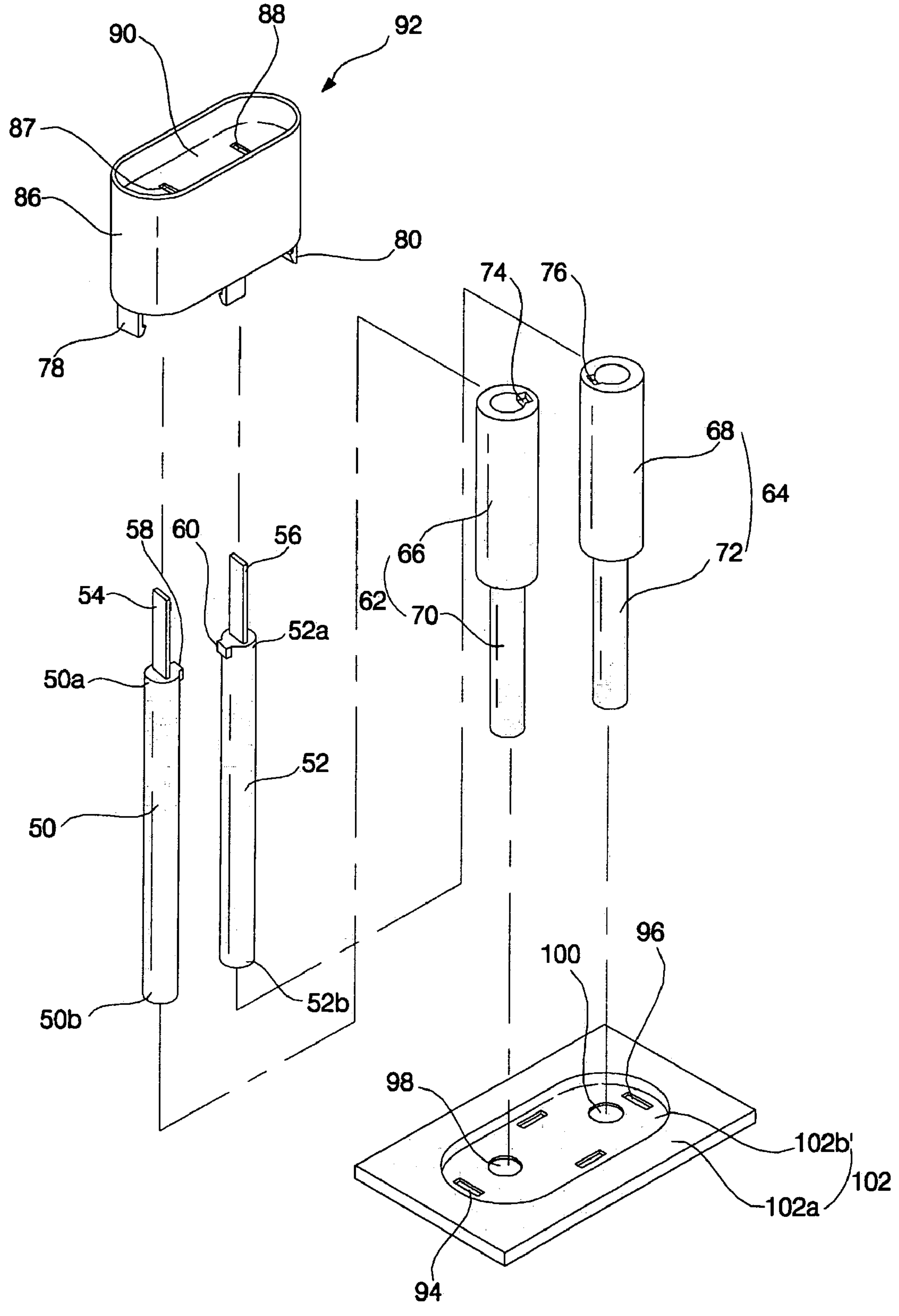
FIG. 6 is an exploded perspective view of the high voltage input apparatus in accordance with the second embodiment of the present invention.

FIG. 5 is a cross-sectional view of a high voltage input apparatus for a magnetron in accordance with a second embodiment of the present invention, and FIG. 6 is an exploded perspective view of the high voltage input apparatus in accordance with the second embodiment of the present invention.

As shown in FIGS. 5 and 6, the high voltage input apparatus in accordance with the second embodiment further comprises hooks 78 and 80 protruded from the tub unit 86 of the insulating case 92, and holes 94 and 96 formed through the ground metal 102 for passing the hooks 78 and 80. Other parts of the high voltage input apparatus in accordance with the second embodiment except for the hooks 78 and 80 and the holes 94 and 96 are substantially the same as those of the high voltage input apparatus in accordance with the first embodiment and are denoted by the same reference numerals even though they are depicted in different drawings, and a detailed description thereof will thus be omitted because it is considered to be unnecessary.

At least two of the hooks 78 and 80 are prepared, and are protruded from the circumference of the tub unit 86 in the downward direction (A).

The ground metal 102 may be provided with the groove unit 102*b* (in FIGS. 3 and 4) for fixing the second protrusion 92 by press fit as described in the first embodiment, or may be provided with a receipt unit 102*b*' for receiving the second protrusion 92.

In case that the groove unit 102*b* (in FIGS. 3 and 4) is formed in the ground metal 102, the groove unit 102*b* (in FIGS. 3 and 4) has the same size as that of the tub unit 86, and in case that the receipt unit 102*b*' is formed in the ground metal 102, the receipt unit 102*b*' has a size larger than that of the tub unit 86.

That is, the bond between the insulating case 92 and the ground metal 102 of the high voltage input apparatus of the present invention may be achieved by inserting the hooks 78 and 80 into the holes 94 and 96, by inserting the tub unit 86 into the groove unit 102*b* (in FIGS. 3 and 4) formed in the ground metal 102 by press fit and inserting the hooks 78 and 80 into the holes 94 and 96, or by mounting the tub unit 86 in the receipt unit 102*b*' formed in the ground metal 102 and inserting the hooks 78 and 80 into the holes 94 and 96.

Figure 7:
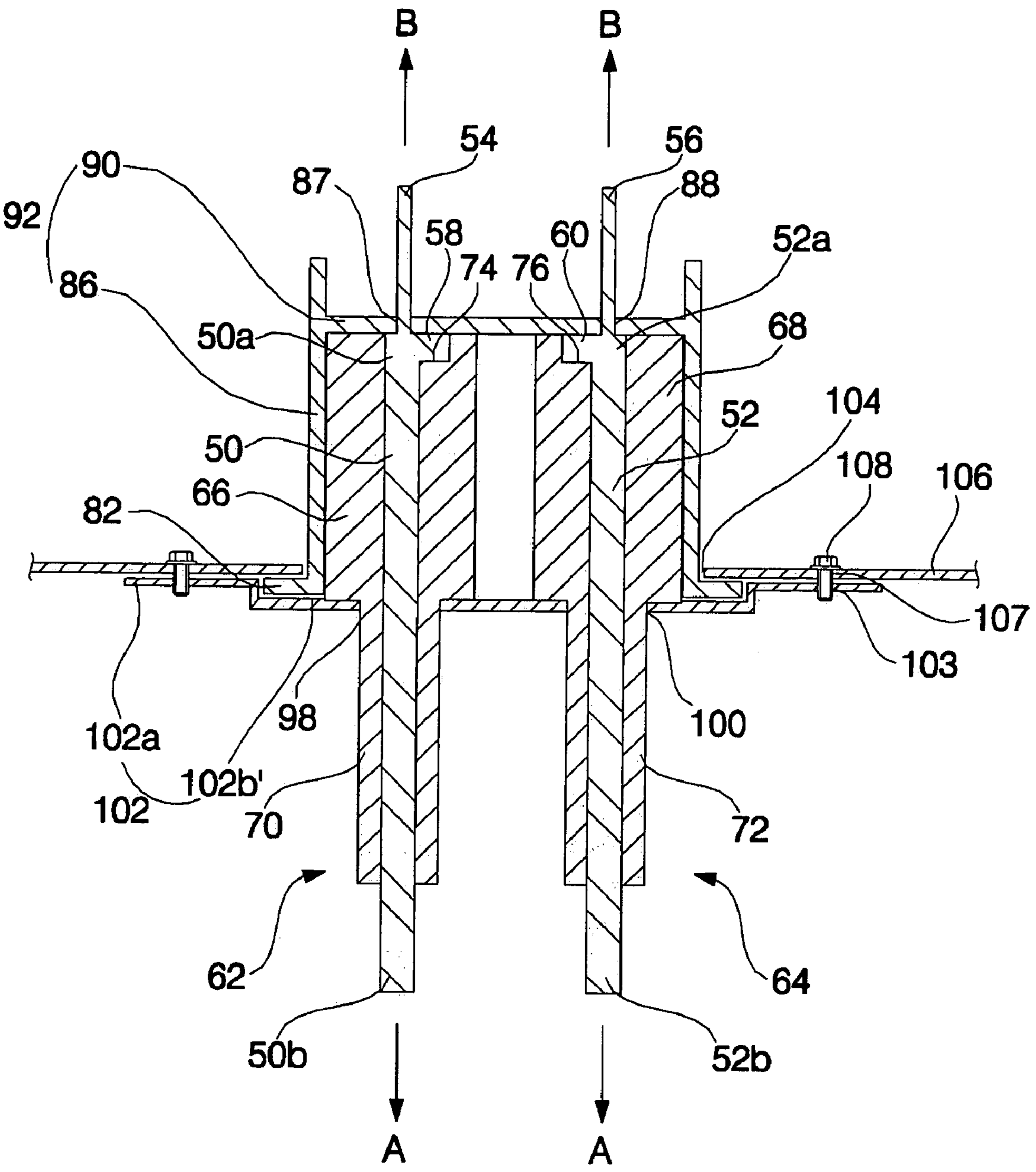
FIG. 7 is a cross-sectional view of a high voltage input apparatus for a magnetron in accordance with a third embodiment of the present invention.
Figure 8:
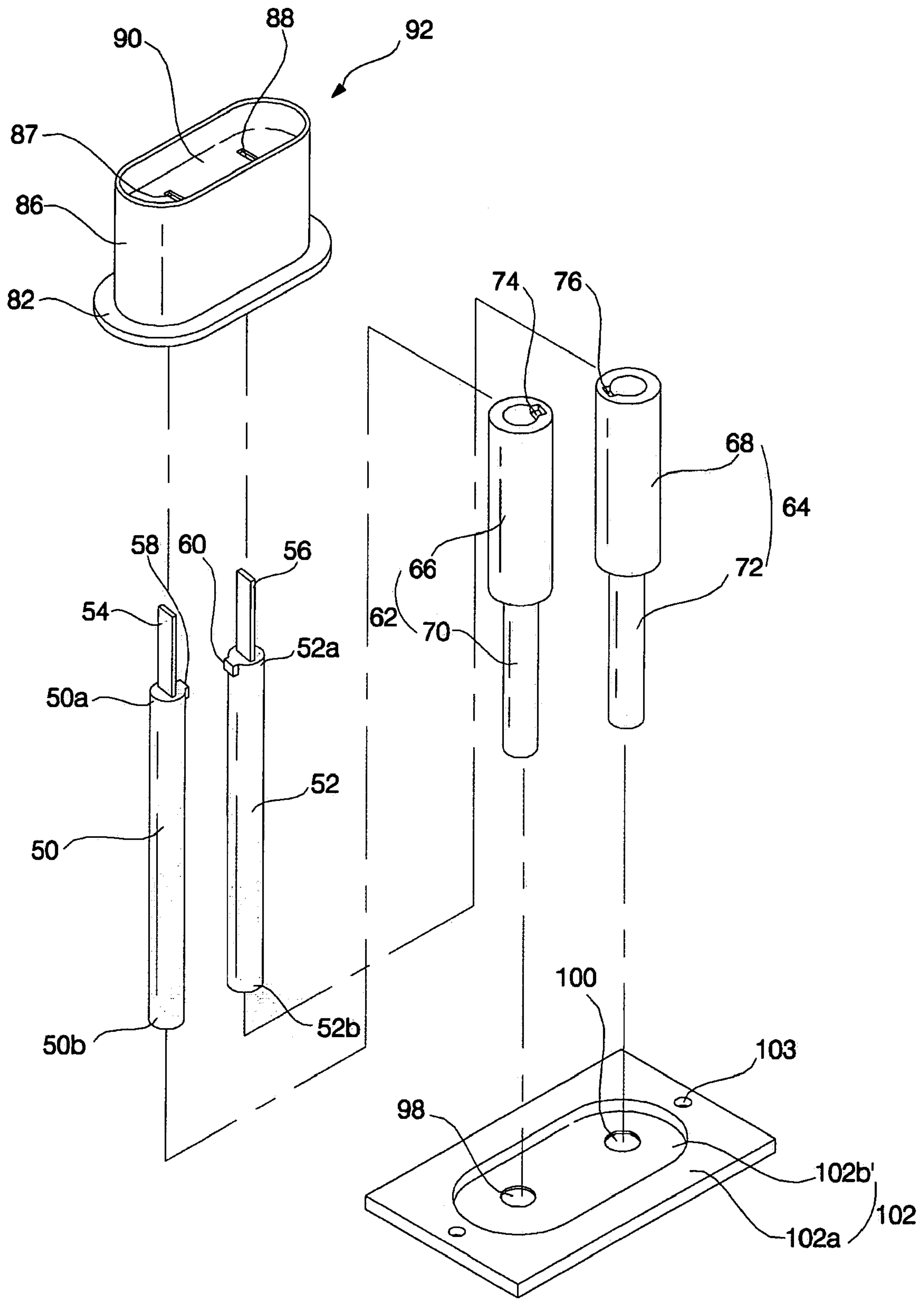
FIG. 8 is an exploded perspective view of the high voltage input apparatus in accordance with the third embodiment of the present invention.

FIG. 7 is a cross-sectional view of a high voltage input apparatus for a magnetron in accordance with a third embodiment of the present invention, and FIG. 8 is an exploded perspective view of the high voltage input apparatus in accordance with the third embodiment of the present invention.

As shown in FIGS. 7 and 8, the high voltage input apparatus in accordance with the third embodiment further comprises a second protrusion 82 formed on the tub unit 86 of the insulating case 92, and a filter case 106 provided with a third through hole 104 for passing the tub unit 86 of the insulating case 92, fixing the second protrusion 82 in the upward direction (B) thereto, and mounting the ground metal 102 thereon. Other parts of the high voltage input apparatus in accordance with the third embodiment except for the second protrusion 82 and the filter case 106 are substantially the same as those of the high voltage input apparatus in accordance with the first embodiment and are denoted by the same reference numerals even though they are depicted in different drawings, and a detailed description thereof will thus be omitted because it is considered to be unnecessary.

Connection holes 103 and 107 are respectively formed through corresponding positions of the ground metal 102 and the filter case 106. The ground metal 102 and the filter case 106 may be fixed to each other by inserting locking members 108, such as bolts, into the connection holes 103 and 107, or by forming a hook protruded from one of the connection holes 103 and 107 and inserting the hook into the other one of the connection holes 103 and 107.

The ground metal 102 includes the plate unit 102*a* contacting the filter case 106, and the receipt unit 102*b*' formed in the plate unit 102*a* for receiving the second protrusion 82. The height of the receipt unit 102*b*' is the same as the thickness of the second protrusion 82.

That is, when the second protrusion 82 is received by the receipt unit 102*b*', the second protrusion 82 is coplanar with the plate unit 102*a*.

When the tub unit 86 of the insulating case 92 of the high voltage input apparatus of the third embodiment passes the third through hole 104 of the filter case 106, the second protrusion 82 of the insulating case 92 is partially overlapped with the ground metal 102 and one surface of the filter case 106 and caught by one surface of the filter case 106 and the ground metal 102 in the upward direction (B) and the downward direction (A). Further, when the locking members 108 are inserted into the connection holes 103 and 107 of the ground metal 102 and the filter case 106, the ground metal 102 is fixed to the filter case 106.

Figure 9:
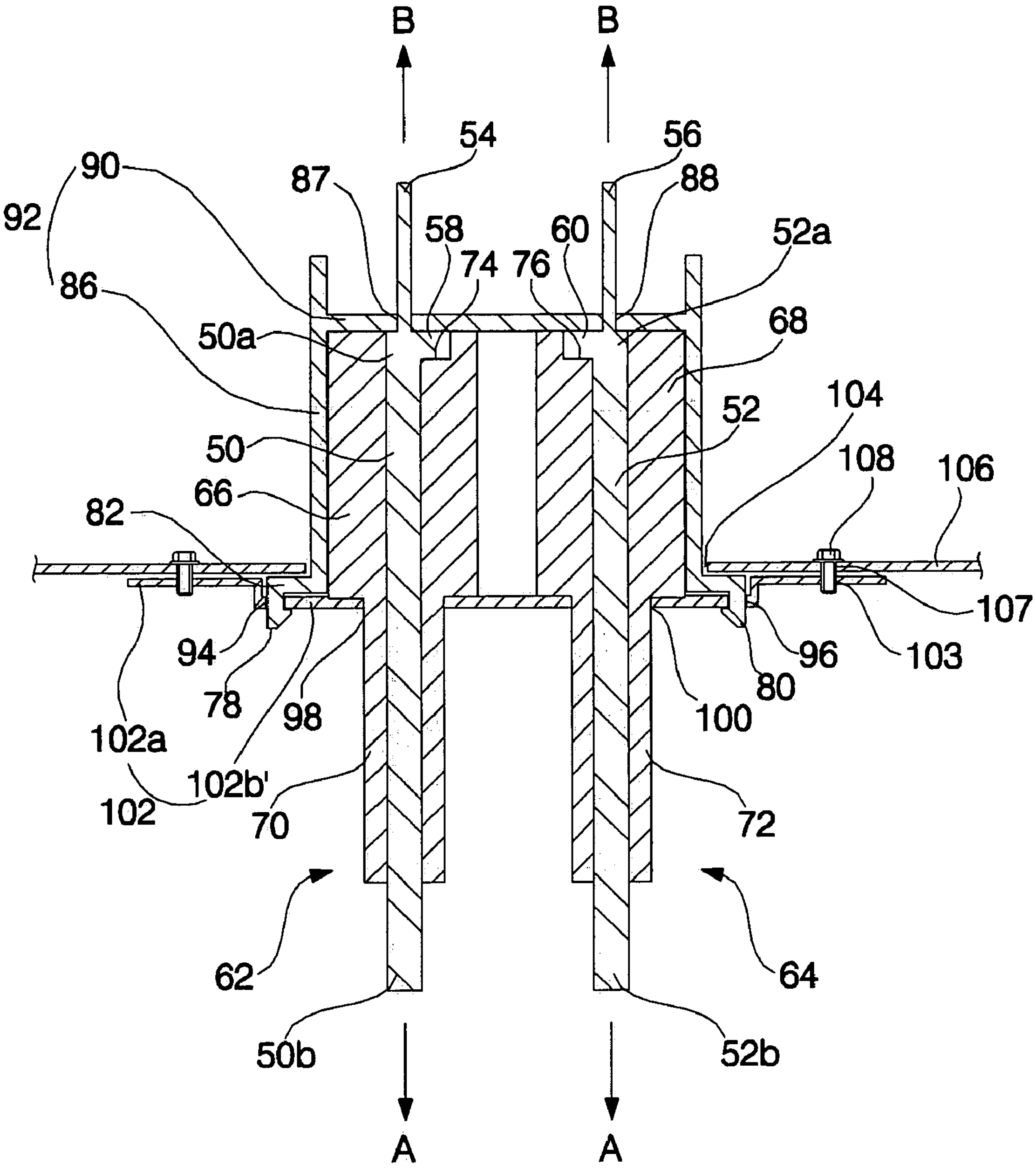
FIG. 9 is a cross-sectional view of a high voltage input apparatus for a magnetron in accordance with a fourth embodiment of the present invention.
Figure 10:
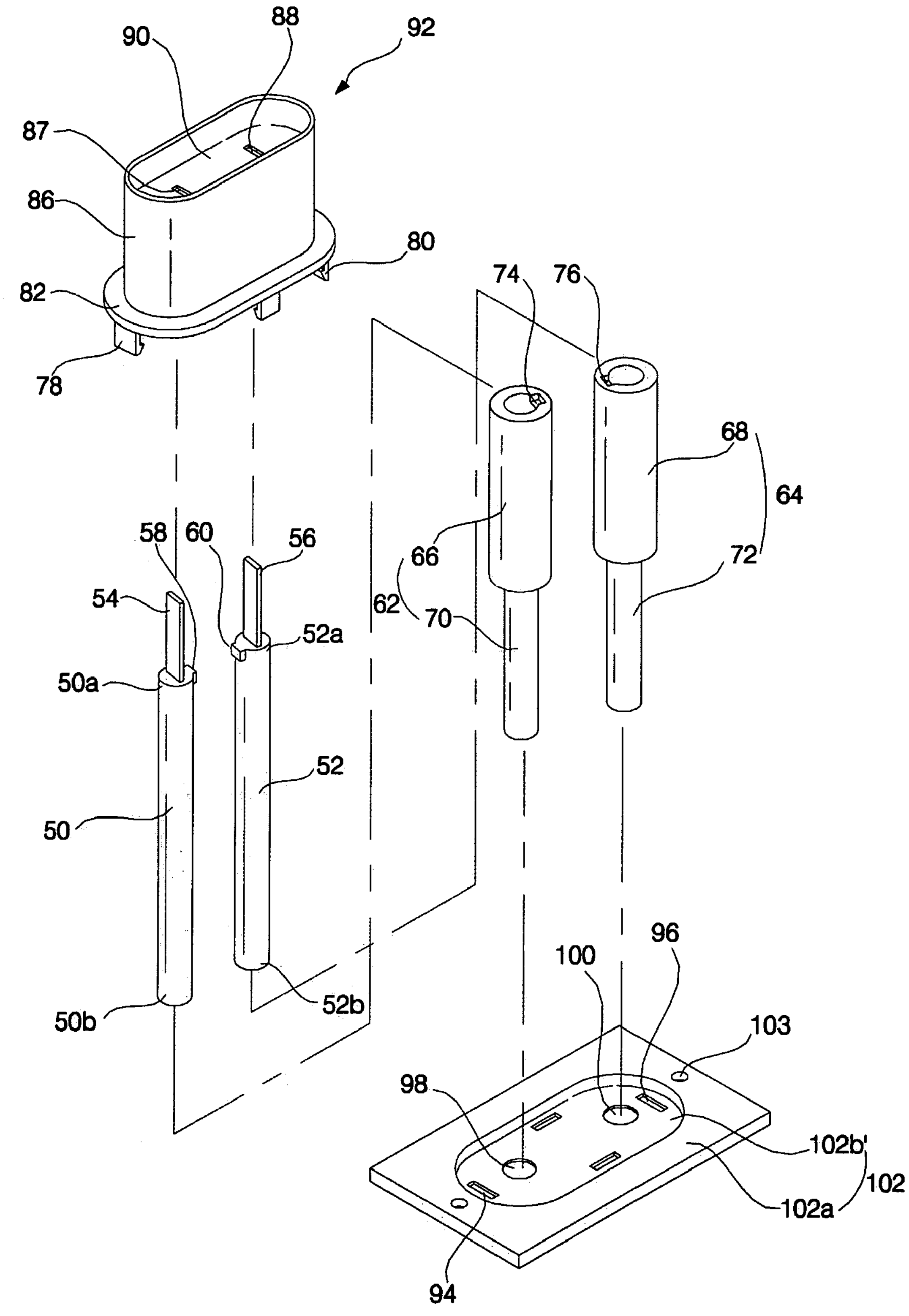
FIG. 10 is an exploded perspective view of the high voltage input apparatus in accordance with the fourth embodiment of the present invention.

FIG. 9 is a cross-sectional view of a high voltage input apparatus for a magnetron in accordance with a fourth embodiment of the present invention, and FIG. 10 is an exploded perspective view of the high voltage input apparatus in accordance with the fourth embodiment of the present invention.

As shown in FIGS. 9 and 10, the high voltage input apparatus in accordance with the fourth embodiment further comprises hooks 78 and 80 protruded from the second protrusion 82, and holes 94 and 96 formed through the receipt unit 102*b*' for passing the hooks 78 and 80. Other parts of the high voltage input apparatus in accordance with the fourth embodiment except for the hooks 78 and 80 and the holes 94 and 96 are substantially the same as those of the high voltage input apparatus in accordance with the third embodiment and are denoted by the same reference numerals even though they are depicted in different drawings, and a detailed description thereof will thus be omitted because it is considered to be unnecessary.

Figure 11:
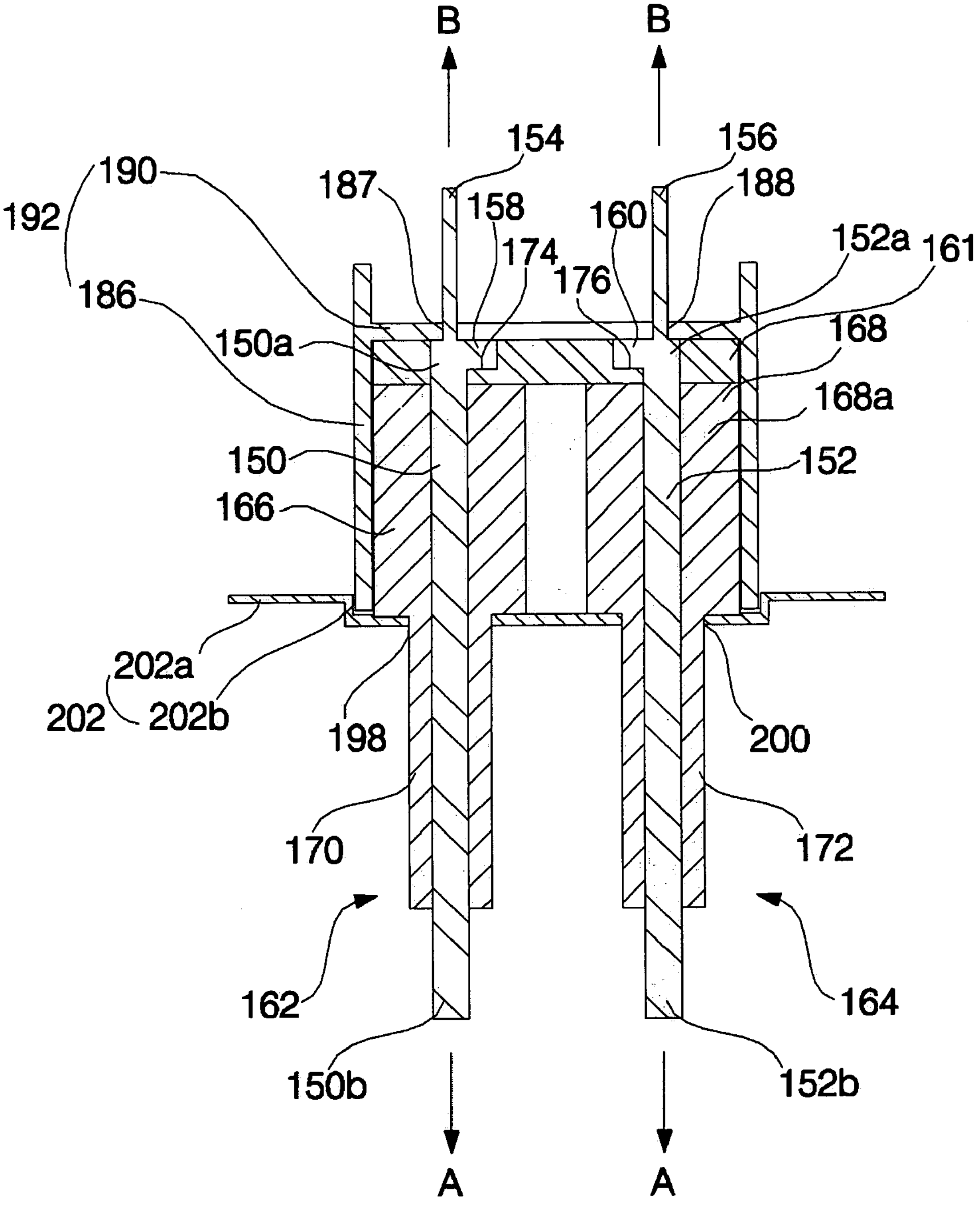
FIG. 11 is a cross-sectional view of a high voltage input apparatus for a magnetron in accordance with a fifth embodiment of the present invention.
Figure 12:
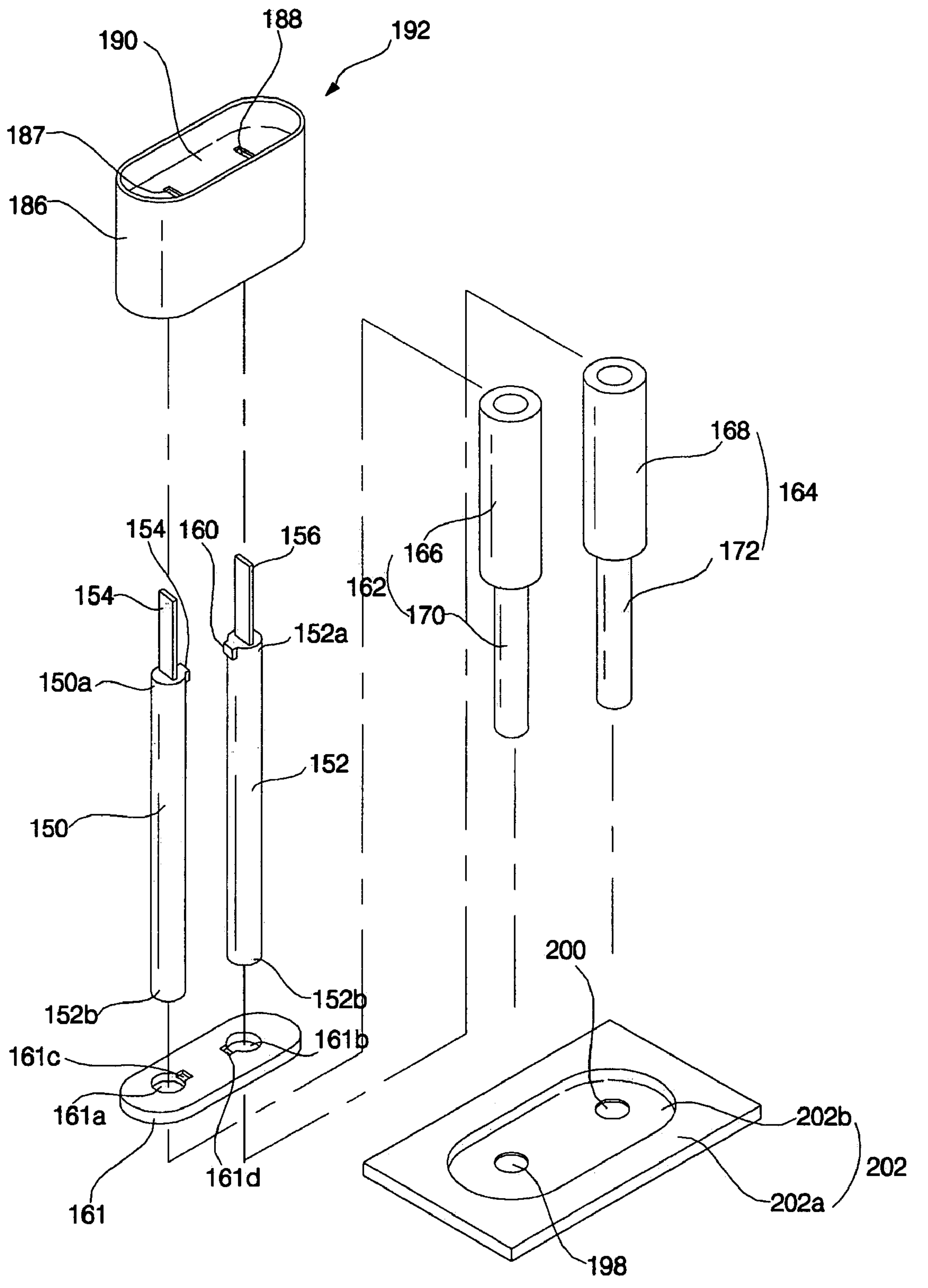
FIG. 12 is an exploded perspective view of the high voltage input apparatus in accordance with the fifth embodiment of the present invention.

FIG. 11 is a cross-sectional view of a high voltage input apparatus for a magnetron in accordance with a fifth embodiment of the present invention, and FIG. 12 is an exploded perspective view of the high voltage input apparatus in accordance with the fifth embodiment of the present invention.+

As shown in FIGS. 11 and 12, the high voltage input apparatus in accordance with the fifth embodiment comprises a pair of lead conductors 150 and 152 including lead taps 154 and 156 and first protrusions 158 and 160, and a high-frequency absorber 161 including first through holes 161*a* and 161*b* for respectively passing the lead conductors 150 and 152 and grooves 161*c* and 161*d* for respectively receiving the first protrusions 158 and 160 in the downward direction (A).

The lead conductors 150 and 152 have a rod shape, and the lead taps 154 and 156 are protruded from ends 150*a* and 152*a* of the lead conductors 150 and 152 in a longitudinal direction and have a square pillar shape.

The first protrusions 158 and 160 are protruded from the side surfaces of the ends 150*a* and 152*a* of the lead conductors 150 and 152, from which the lead taps 54 and 56 are protruded, in the direction of thickness.

The first protrusions 158 and 160 may be protruded from the whole peripheries of the lead conductors 150 and 152 such that the first protrusions 158 and 160 have a disk shape. Preferably, the first protrusions 158 and 160 are protruded from parts of the whole peripheries of the lead conductors 150 and 152 so that the first protrusions 158 and 160 are caught by the high-frequency absorber 161 in a rotational direction.

A pair of the lead conductors 150 and 152 serve to apply high voltage to the magnetron, and are made of metal.

The high-frequency absorber 161 is made of ferrite.

In case that the first protrusions 158 and 160 have a disk shape, the grooves 161*c* and 161*d* have a disk shape such that the first protrusions 158 and 160 are fixedly inserted into the grooves 161*c* and 161*d*, and in case that the first protrusions 158 and 160 have a designated shape protruded from parts of the whole peripheries of the lead conductors 150 and 152, the grooves 161*c* and 161*d* have the same shape as that of the first protrusions 158 and 160 such that the first protrusions 158 and 160 are inserted into the grooves 161*c* and 161*d* and are then caught by the grooves 161*c* and 161*d* in the direction of rotation.

A pair of the lead conductors 150 and 152 are surrounded by insulators 162 and 164.

The insulators 162 and 164 surround the lead conductors 50 and 52 and have sufficient withstand voltage. One insulator, through which the lead conductors 150 and 152 pass, can be installed, and the above two insulators 162 and 164, through which the lead conductors 150 and 152 respectively pass, can be installed such that the two insulators 621 and 164 are separated from each other. Hereinafter, for convenience of description, the two insulators 162 and 164 are used.

The insulators 162 and 164 are hollowed such that the lead conductors 150 and 152 respectively pass through the insulators 162 and 164 in a longitudinal direction. Expanded portions 166 and 168 having an increased thickness are respectively formed at designated portions of the insulators 162 and 164. The expanded portions 166 and 168 are expanded from other portions 170 and 172 of the insulators 162 and 164 (referred to as "contracted portions") in a stepwise structure.

The insulators 162 and 164 have a length shorter than that of the lead conductors 150 and 152 so that the lead taps 154 and 156 and the other ends 150*b* and 152*b* of the lead conductors 150 and 152, opposite to the lead taps 154 and 156, are exposed to the outside when the lead conductors 150 and 152 are inserted into the insulators 162 and 164.

The high voltage input apparatus further comprises an insulating case 192 including a tub unit 186, into which the high-frequency absorber 160 and the expanded portions 166 and 168 of the insulators 162 and 164 are inserted, and a plate unit 190, by which the first protrusions 158 and 160 or the high-frequency absorber 161 are caught in the upward direction (B), provided with second through holes 187 and 188 for passing the lead taps 154 and 156.

At least one part of the inner surface of the tub unit 186 has a shape corresponding to the shape of one part of the outer peripheries of the expanded portions 166 and 168 so that the outer peripheries of the expanded portions 166 and 168 contact the inner surface of the tub unit 186.

The plate unit 190 is formed integrally with one end of the inner circumference of the tub unit 186.

The high voltage input apparatus further comprises a ground metal 202 including a groove unit 202*b*, into which the tub unit 186 is inserted by press fit, bonded to the insulating case 192, and third through holes 198 and 200, through which the contracted portions 170 and 172 of the insulators 162 and 164 pass, fixing the expanded portions 166 and 168.

The ground metal 202 includes a plate body unit 202*a*, and the groove unit 202*b* formed in the plate body unit 202*a*, into which the tub unit 186 is inserted by press fit. The groove unit 202*b* has the same size as that of the tub unit 186 so that the tub unit 186 is inserted into the groove unit 202*b* by press fit.

The groove unit 202*b* is indented into the surface of the plate body unit 202*a* by the same size as that of the tub unit 186.

Hereinafter, an assembling process of the above-described high voltage input apparatus will be described in detail.

When the lead conductors 150 and 152 are respectively inserted into the first through holes 161*a* and 161*b* of the high-frequency absorber 161, and the first protrusions 158 and 160 of the lead conductors 150 and 152 are caught by the grooves 161*c* and 161*d* of the high-frequency absorber 161, the lead conductors 150 and 152 are caught by the high-frequency absorber 161 in the downward direction (A).

Then, when the lead conductors 150 and 152 are respectively inserted into the insulators 162 and 164, and other portions of the lead conductors 150 and 152 except for the lead taps 154 and 156 and the ends 150*b* and 152*b* of the lead conductors 150 and 152, opposite to the lead taps 154 and 156, are surrounded by the high-frequency absorber 161 and the insulators 162 and 164.

Thereafter, when the lead conductors 150 and 152, the high-frequency absorber 161 and the expanded portions 166 and 168 of the insulators 162 and 164 are inserted into the tub unit 186 of the insulating case 192 and the lead taps 154 and 156 of the lead conductors 150 and 152 pass through the second through holes 187 and 188 formed through the plate unit 190 of the insulating case 192, the ends 150*a* and 152*a* of the lead conductors 150 and 152, from which the lead taps 154 and 156 are protruded, and the first protrusions 158 and 160 are fixed to one surface of the plate unit 190 of the insulating case 192 in the upward direction (B), and the high-frequency absorber 161 is fixed to one surface of the plate unit 190 of the insulating case 192 in the upward direction (B).

Under the above state, when the ends 150*b* and 152*b* of the lead conductors 150 and 152, opposite to the lead taps 154 and 156, and the contracted portions 170 and 172 of the insulators 162 and 164 pass through the second through holes 198 and 200 of the ground metal 202, and the tub unit 186 is inserted into the groove unit 202*b* of the ground metal 202 by press fit, the insulating case 192 is fixed to the ground metal 202 by press fit, and the high-frequency absorber 161 and the expanded portions 166 and 168 of the insulators 162 and 164 are surrounded by the tub unit 186 and the plate unit 190 of the insulating case 192 and the ground metal 202, and caught by the plate unit 190 and the ground metal 202 respectively in the upward direction (B) and the downward direction (A).

When the lead taps 154 and 156 of the lead conductors 150 and 152 or the insulating case 192 of the above-assembled high voltage input apparatus are drawn in the upward direction (B), the ends 150*a* and 152*a* of the lead conductors 150 and 152 provided with the lead taps 154 and 156 and the first protrusions 158 and 160 are caught by one surface of the plate unit 190 of the insulating case 192 in the upward direction (B), thereby being prevented from being separated from the plate unit 190. Further, the tub unit 186 of the insulating case 192 is inserted into the ground metal 202, thereby being prevented from being separated from the ground metal 202.

On the other hand, when the ends 150*b* and 152*b* of the lead conductors 150 and 152, opposite to the lead taps 154 and 156, are drawn in the downward direction (A), the first protrusions 158 and 160 of the lead conductors 150 and 152 are caught by the grooves 161*c* and 161*d* of the high-frequency absorber 161 in the downward direction (A) and the expanded portions 166 and 168 of the insulators 162 and 164 are caught by the ground metal 202 in the downward direction (A). Thereby, the lead conductors 150 and 152 are prevented from being separated from the insulators 162 and 164, and the insulators 162 and 164 are prevented from being separated from the ground metal 202.

Figure 13:
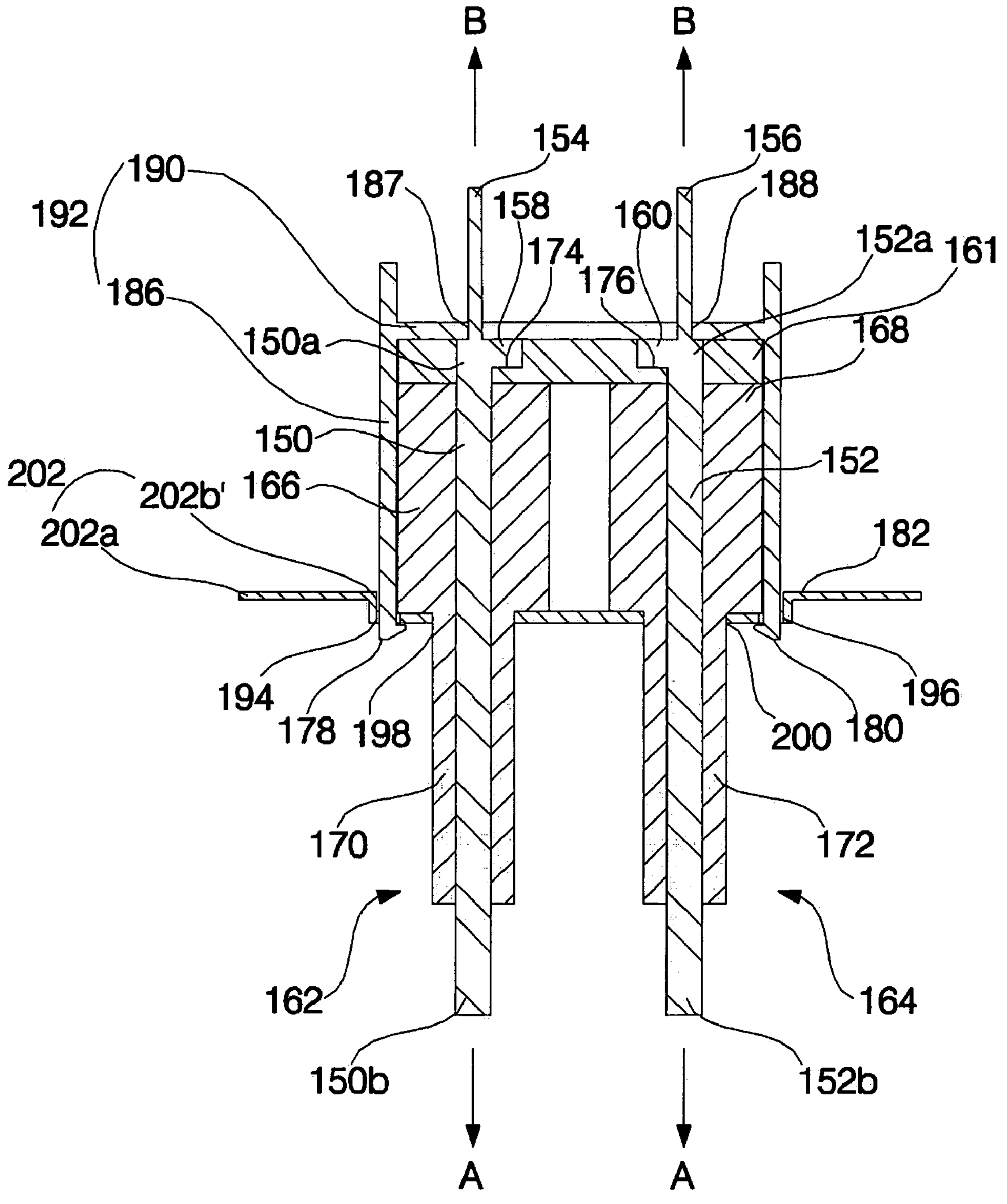
FIG. 13 is a cross-sectional view of a high voltage input apparatus for a magnetron in accordance with a sixth embodiment of the present invention.
Figure 14:
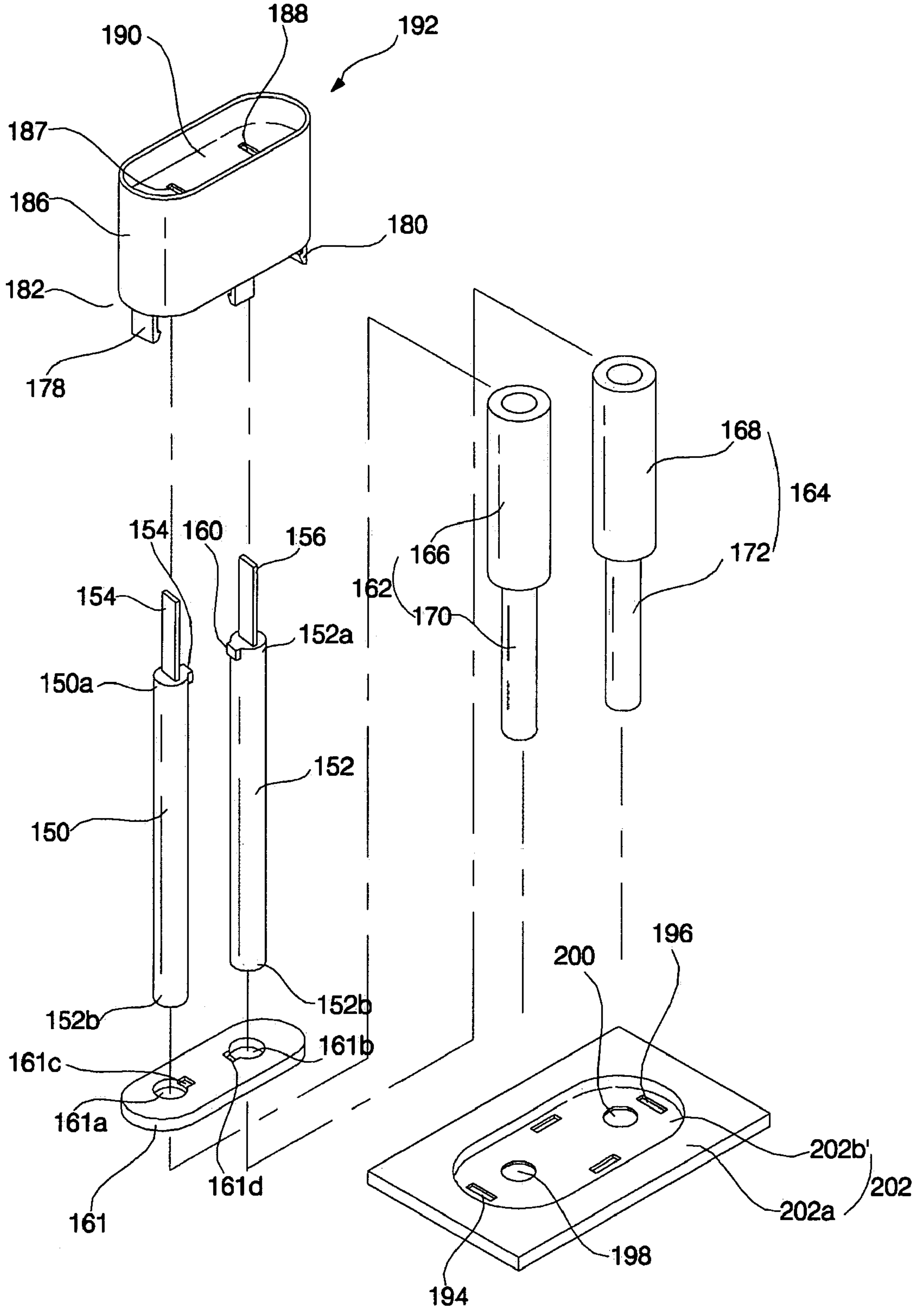
FIG. 14 is an exploded perspective view of the high voltage input apparatus in accordance with the sixth embodiment of the present invention.

FIG. 13 is a cross-sectional view of a high voltage input apparatus for a magnetron in accordance with a sixth embodiment of the present invention, and FIG. 14 is an exploded perspective view of the high voltage input apparatus in accordance with the sixth embodiment of the present invention.

As shown in FIGS. 13 and 14, the high voltage input apparatus in accordance with the sixth embodiment further comprises hooks 178 and 180 protruded from the tub unit 186 of the insulating case 192, and holes 194 and 196 formed through the ground metal 202 for passing the hooks 178 and 180. Other parts of the high voltage input apparatus in accordance with the sixth embodiment except for the hooks 178 and 180 and the holes 194 and 196 are substantially the same as those of the high voltage input apparatus in accordance with the fifth embodiment and are denoted by the same reference numerals even though they are depicted in different drawings, and a detailed description thereof will thus be omitted because it is considered to be unnecessary.

The hooks 178 and 180 are prepared in at least two, and are protruded from the circumference of the tub unit 186 in the downward direction (A).

The ground metal 202 may be a flat plate contacting one surface of the tub unit 186, may be provided with the groove unit 202*b* for fixing the tub unit 186 by press fit as described in the fifth embodiment, or may be provided with a receipt unit 202*b*' for receiving the tub unit 186 as described in the sixth embodiment.

In case that the groove unit 202*b* (in FIGS. 9 and 10) is formed in the ground metal 202, the groove unit 202*b* (in FIGS. 9 and 10) has the same size as that of the tub unit 186, and in case that the receipt unit 202*b*' is formed in the ground metal 202, the receipt unit 202*b*' has a size larger than that of the tub unit 186.

Figure 15:
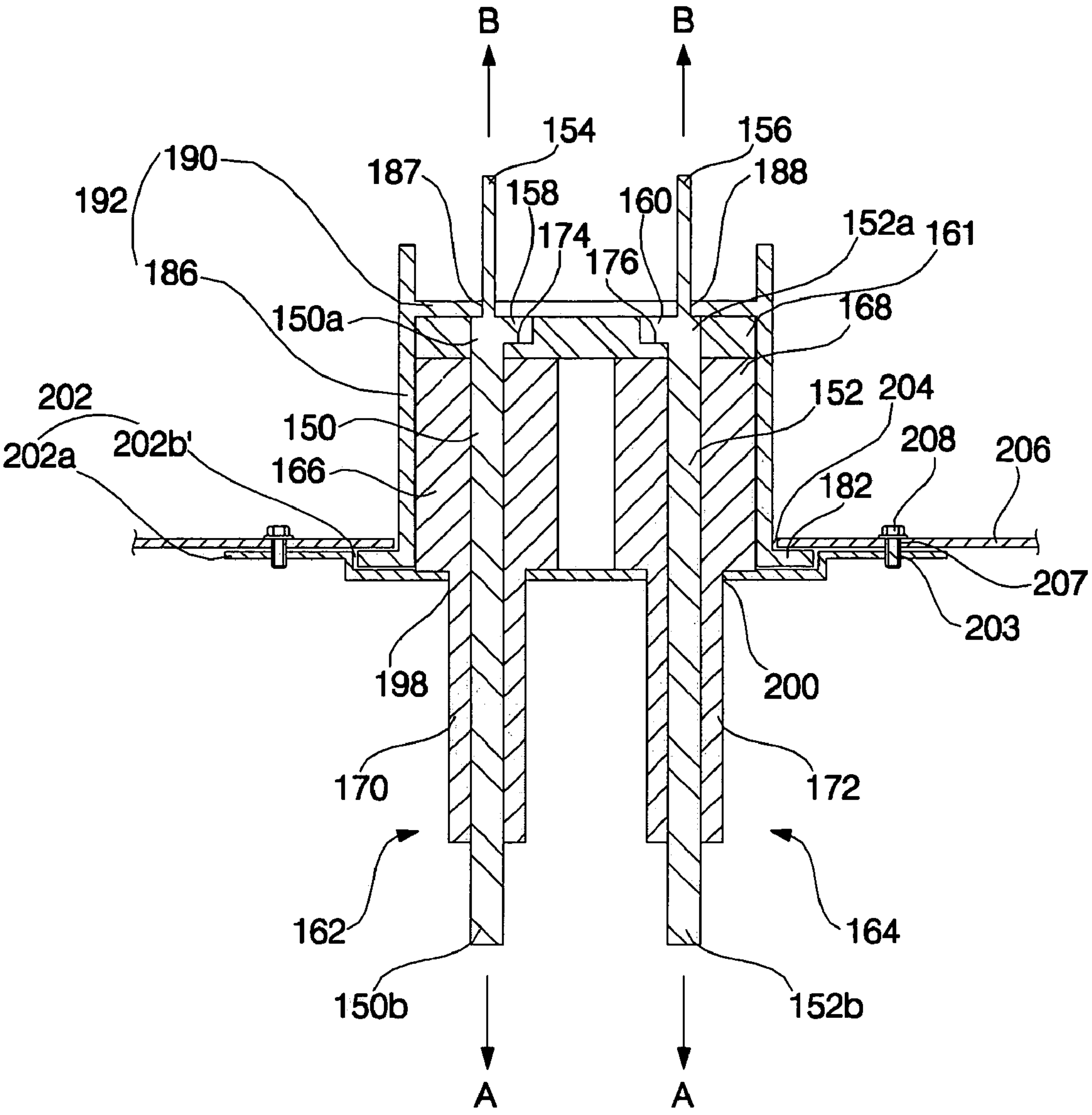
FIG. 15 is a cross-sectional view of a high voltage input apparatus for a magnetron in accordance with a seventh embodiment of the present invention.
Figure 16:
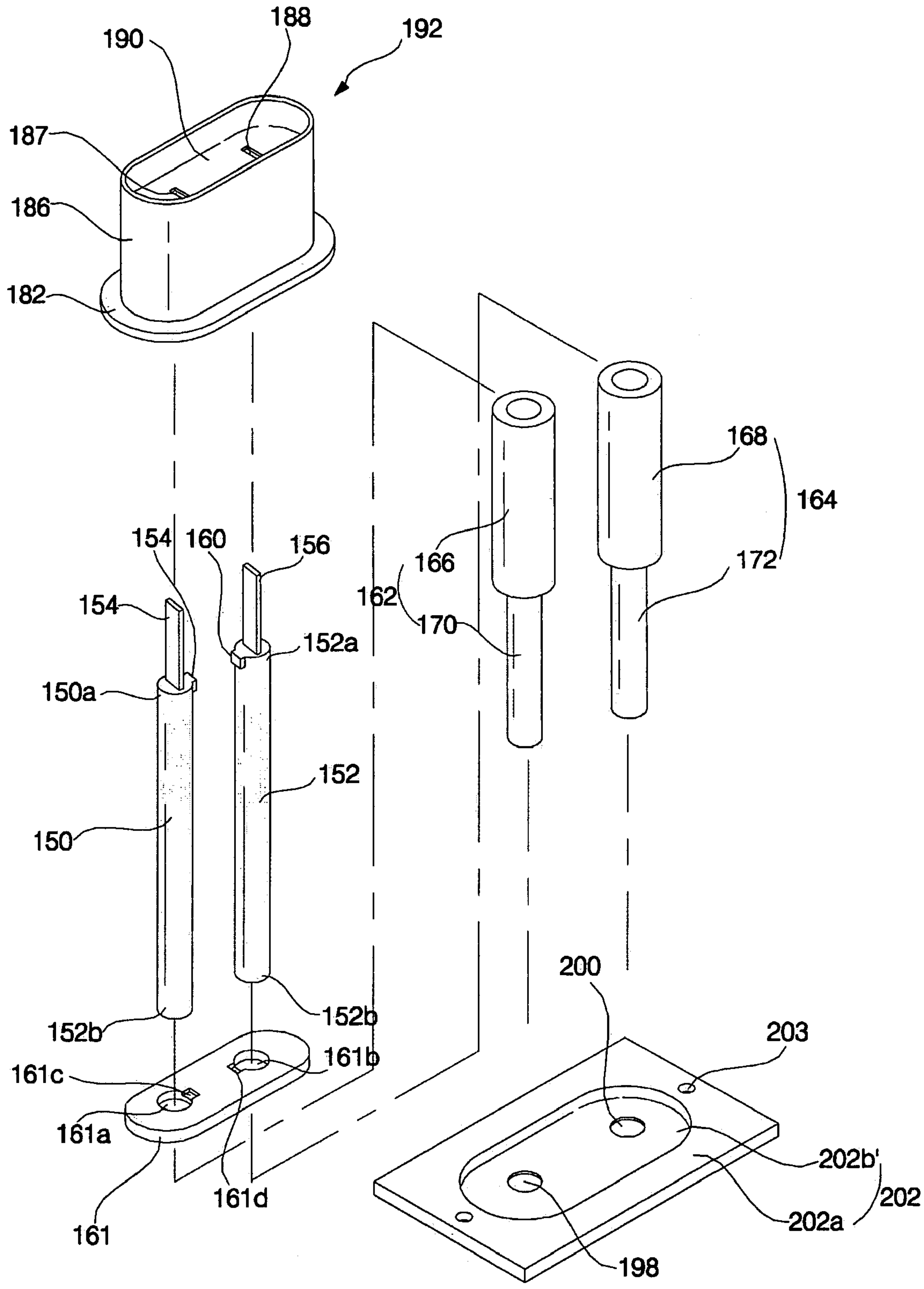
FIG. 16 is an exploded perspective view of the high voltage input apparatus in accordance with the seventh embodiment of the present invention.

FIG. 15 is a cross-sectional view of a high voltage input apparatus for a magnetron in accordance with a seventh embodiment of the present invention, and FIG. 16 is an exploded perspective view of the high voltage input apparatus in accordance with the seventh embodiment of the present invention.

As shown in FIGS. 15 and 16, the high voltage input apparatus in accordance with the seventh embodiment further comprises a second protrusion 182 formed on the tub unit 186 of the insulating case 192, and a filter case 206 provided with a fourth through hole 204 for passing the tub unit 186 of the insulating case 192, fixing the second protrusion 182 in the upward direction (B) thereto, and mounting the ground metal 202 thereon. Other parts of the high voltage input apparatus in accordance with the seventh embodiment except for the filter case 206 are substantially the same as those of the high voltage input apparatus in accordance with the fifth embodiment and are denoted by the same reference numerals even though they are depicted in different drawings, and a detailed description thereof will thus be omitted because it is considered to be unnecessary.

Connection holes 203 and 207 are respectively formed through corresponding positions of the ground metal 202 and the filter case 206. The ground metal 202 and the filter case 206 may be fixed to each other by inserting locking members 208, such as bolts, into the connection holes 203 and 207, or by forming a hook protruded from one of the connection holes 203 and 207 and inserting the hook into the other one of the connection holes 203 and 207.

The ground metal 202 includes the plate unit 202*a* contacting the filter case 206, and the receipt unit 202*b*' formed in the plate unit 202*b* for receiving the second protrusion 182. The height of the receipt unit 202*b*' is the same as the thickness of the second protrusion 182.

That is, when the second protrusion 182 is received by the receipt unit 202*b*', the second protrusion 182 is coplanar with the plate unit 202*a*.

When the tub unit 186 of the insulating case 192 of the high voltage input apparatus of the seventh embodiment passes the fourth through hole 204 of the filter case 206, the second protrusion 182 of the insulating case 192 is partially overlapped with the ground metal 202 and the filter case 206 and caught by one surface of the filter case 206 in the upward direction (B) and the downward direction (A). Further, when the locking members 208 are inserted into the connection holes 203 and 207 of the ground metal 202 and the filter case 206, the ground metal 202 is fixed to the filter case 206.

Figure 17:
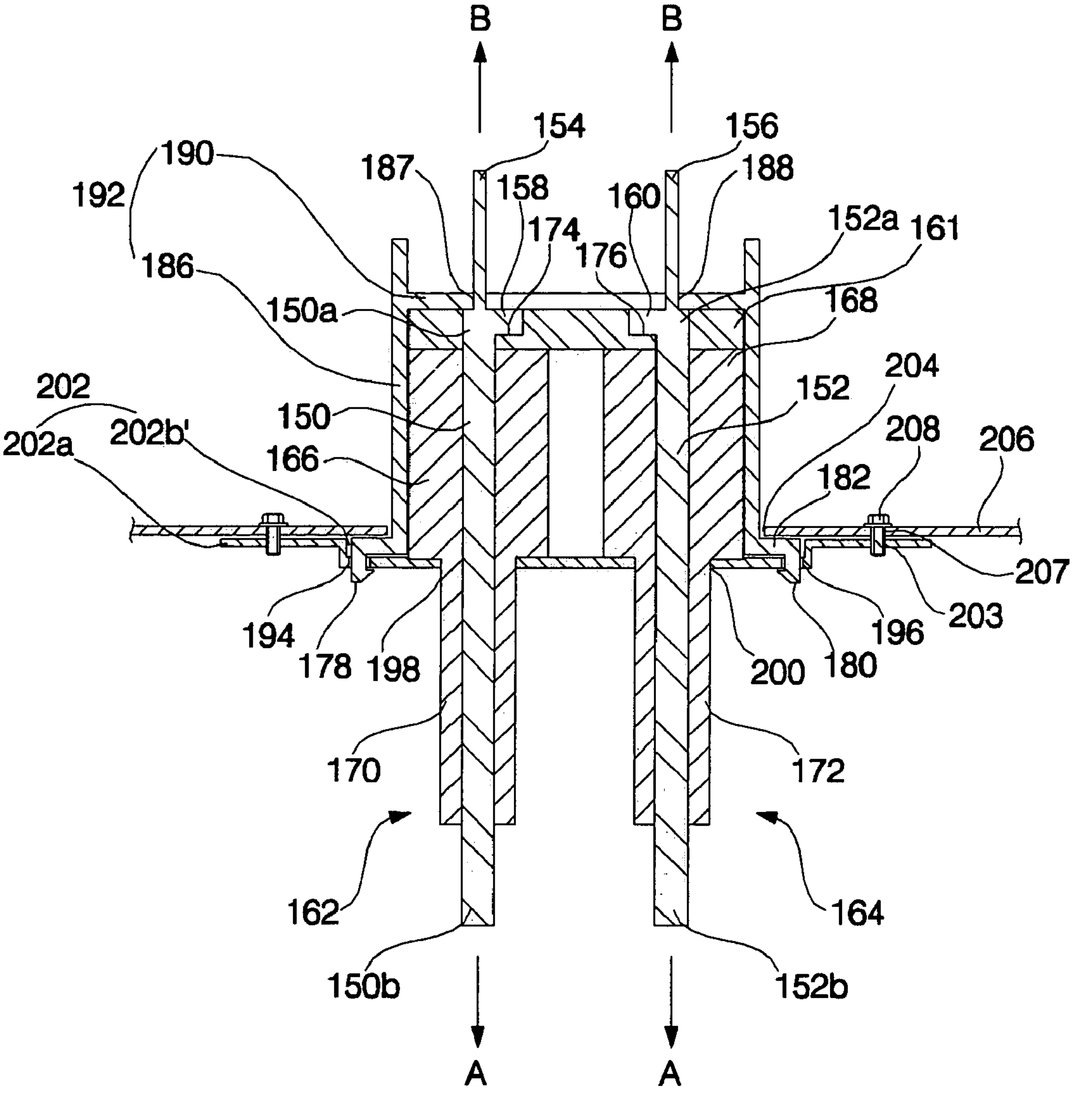
FIG. 17 is a cross-sectional view of a high voltage input apparatus for a magnetron in accordance with an eighth embodiment of the present invention.
Figure 18:
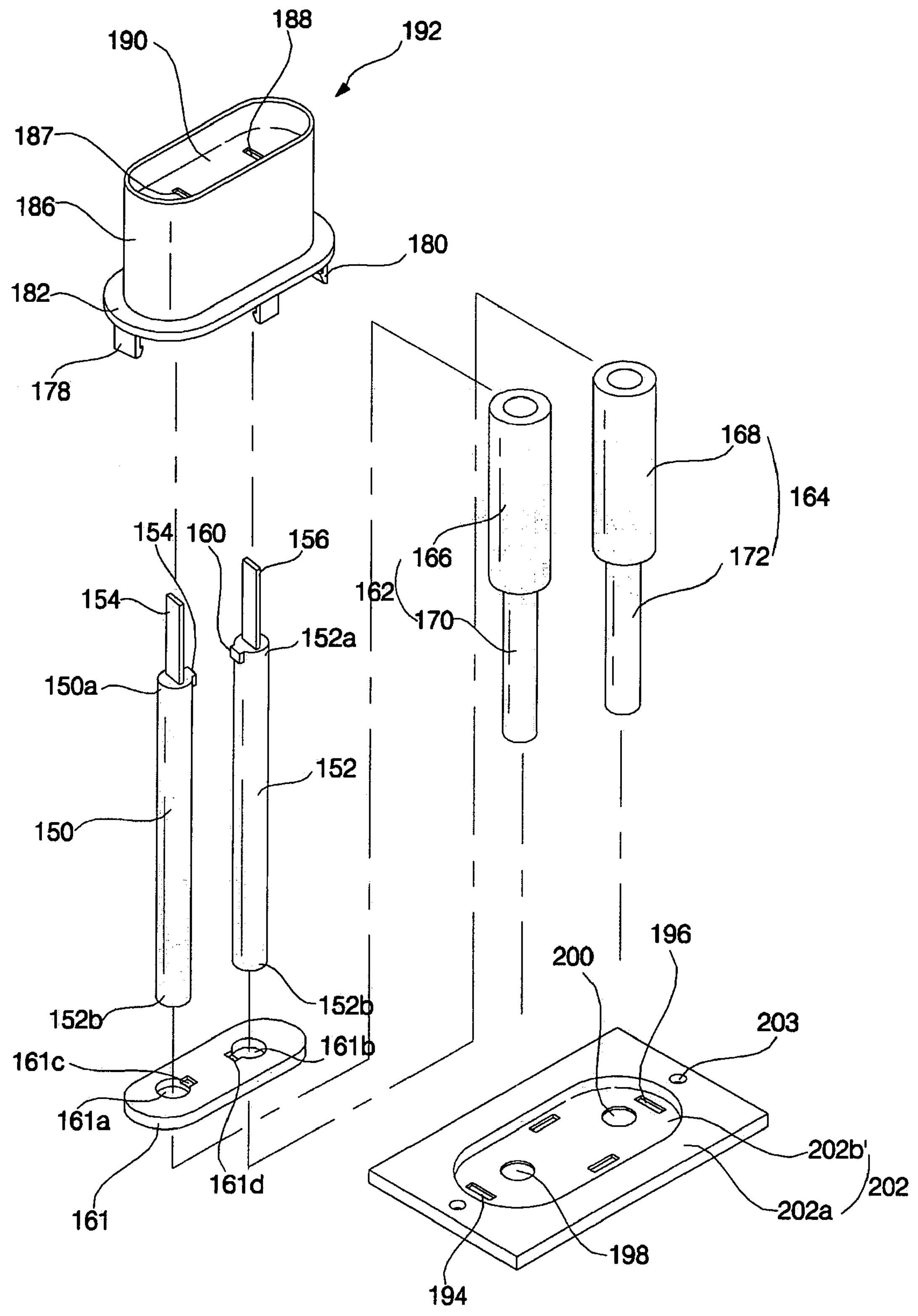
FIG. 18 is an exploded perspective view of the high voltage input apparatus in accordance with the eighth embodiment of the present invention.

FIG. 17 is a cross-sectional view of a high voltage input apparatus for a magnetron in accordance with an eighth embodiment of the present invention, and FIG. 18 is an exploded perspective view of the high voltage input apparatus in accordance with the eighth embodiment of the present invention.

As shown in FIGS. 17 and 18, the high voltage input apparatus in accordance with the eighth embodiment further comprises hooks 178 and 180 protruded from the second protrusion 182, and holes 194 and 196 formed through the receipt unit 102*b*' for passing the hooks 178 and 180. Other parts of the high voltage input apparatus in accordance with the eighth embodiment except for the hooks 178 and 180 and the holes 194 and 196 are substantially the same as those of the high voltage input apparatus in accordance with the seventh embodiment and are denoted by the same reference numerals even though they are depicted in different drawings, and a detailed description thereof will thus be omitted because it is considered to be unnecessary.

Figure 19:
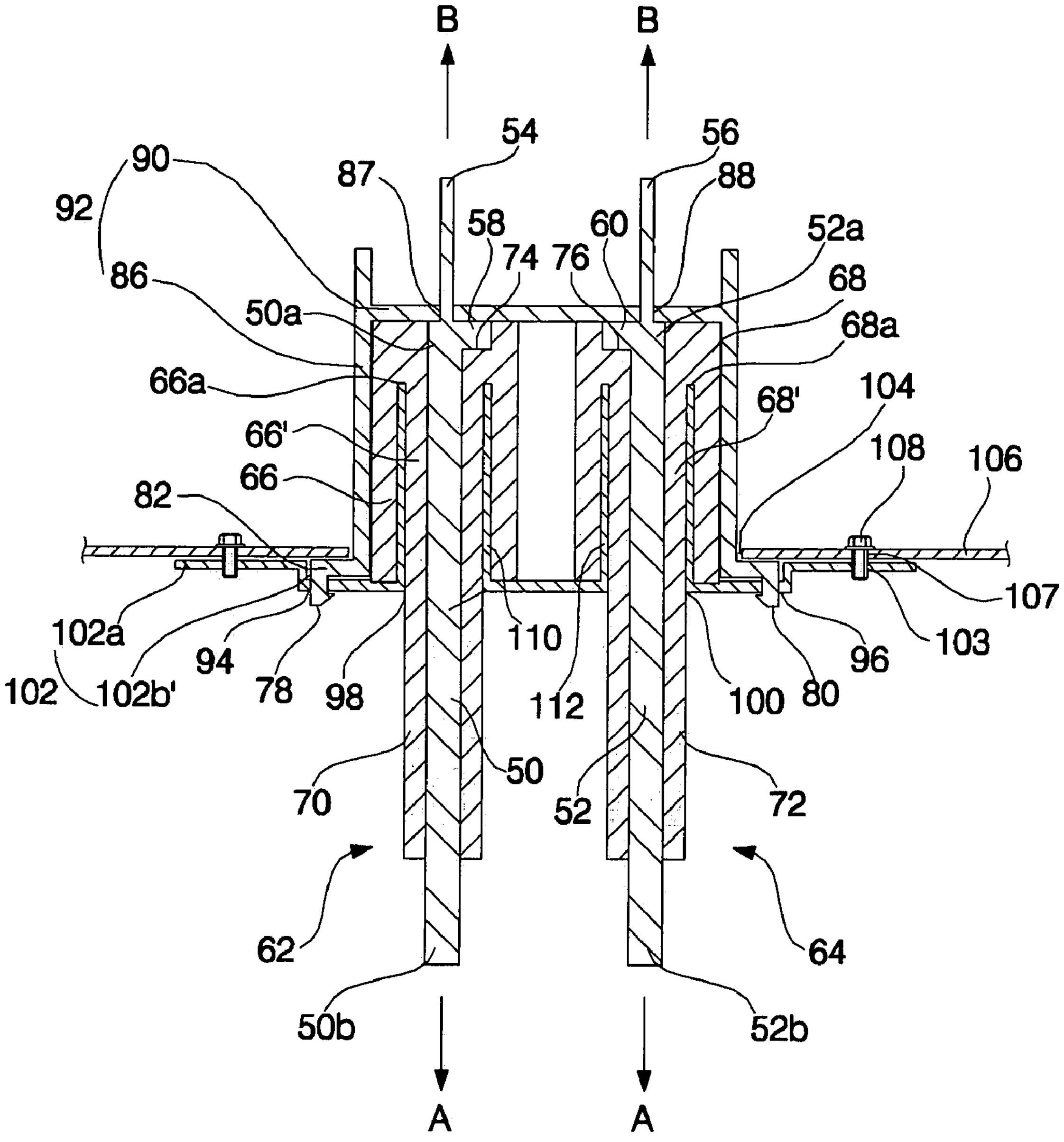
FIG. 19 is a cross-sectional view of a high voltage input apparatus for a magnetron in accordance with a ninth embodiment of the present invention.
Figure 20:
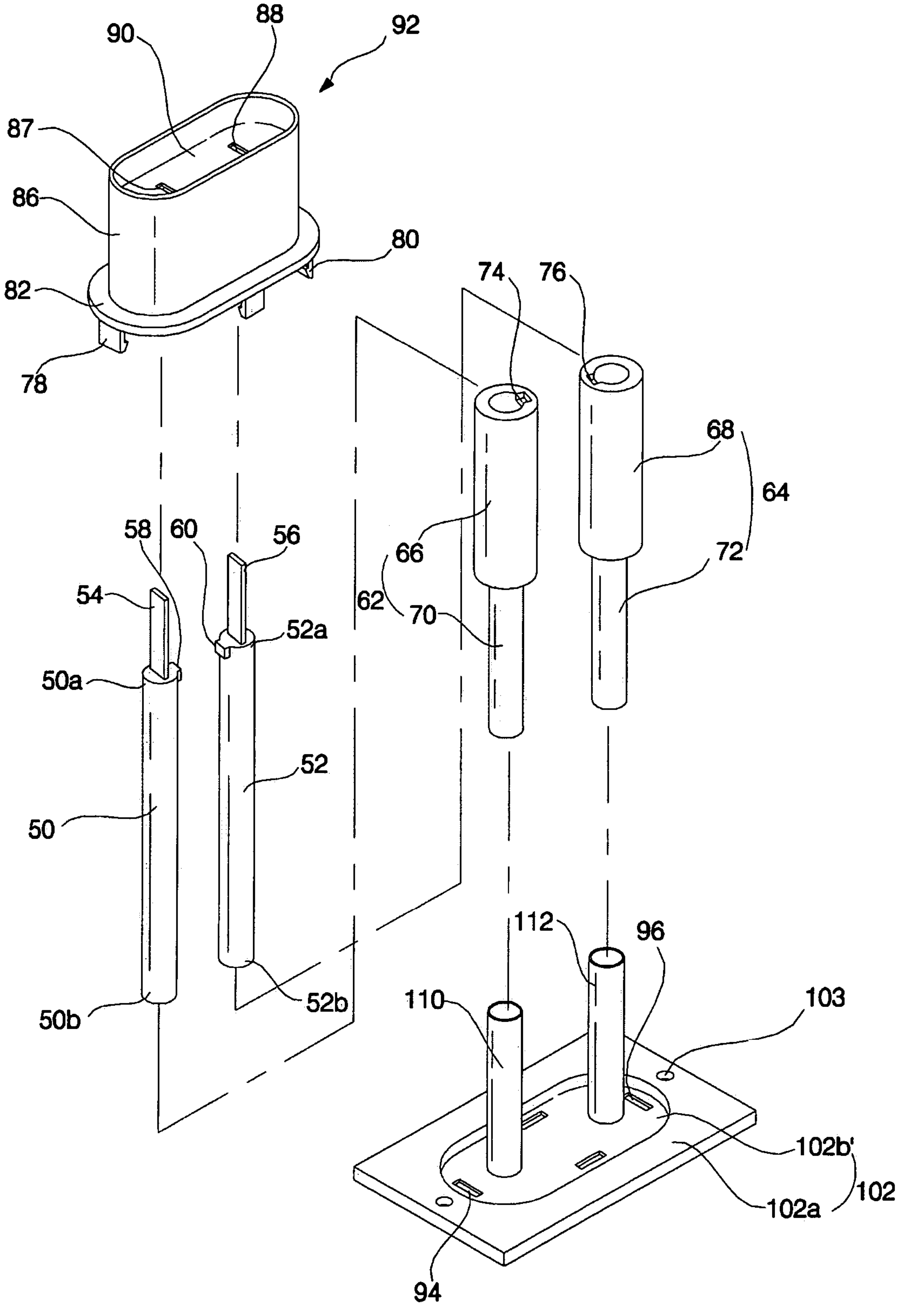
FIG. 20 is an exploded perspective view of the high voltage input apparatus in accordance with the ninth embodiment of the present invention.

FIG. 19 is a cross-sectional view of a high voltage input apparatus for a magnetron in accordance with a ninth embodiment of the present invention, and FIG. 20 is an exploded perspective view of the high voltage input apparatus in accordance with the ninth embodiment of the present invention.

As shown in FIGS. 19 and 20, the high voltage input apparatus in accordance with the ninth embodiment further comprises metal guides 110 and 112 inserted into the insulators 62 and 64 so that parts of the insulators 62 and 64 are respectively interposed between the lead conductors 50 and 52. Other parts of the high voltage input apparatus in accordance with the ninth embodiment except for the metal guides 110 and 112 are substantially the same as those of the high voltage input apparatus in accordance with any one embodiment of the first to eighth embodiments and are denoted by the same reference numerals even though they are depicted in different drawings, and a detailed description thereof will thus be omitted because it is considered to be unnecessary.

The metal guides 110 and 112 are connected to or formed integrally with the ground metal 102 such that internal insulators 66' and 68' interposed between the lead conductors 50 and 52 and the metal guides 110 and 122 have capacitors having a designated value.

That is, the internal insulators 66' and 68' interposed between the lead conductors 50 and 52 and the metal guides 110 and 122 are components of an LC filter for shielding noise generated when the magnetron is operated.

Preferably, two of the metal guides 110 and 112 are prepared so that the metal guides 110 and 112 are respectively inserted into the insulator 62 and 64. The metal guides 110 and 112 are connected to or formed on the ground metal 102 such that the metal guides 110 and 112 communicate with the inner surfaces of the second through holes 98 and 100 of the ground metal 102. Thereby, the contracted portions 70 and 72 of the insulators 62 and 64 respectively pass through the metal guides 110 and 112, and are inserted into the expanded portions 66 and 68 of the insulators 62 and 64.

Acceptance grooves 66*a* and 68*a*, for receiving the metal guides 110 and 112 therein, are longitudinally formed in the expanded portions 66 and 68 of the insulators 62 and 64.

The acceptance grooves 66*a* and 68*a* and the metal guides 110 and 112 have a tubular shape.

After the metal guides 110 and 112 of the high voltage input apparatus in accordance with the ninth embodiment are positioned such that the inner surfaces of the metal guides 110 and 112 communicate with the second through holes 98 and 100 of the ground metal 102, ends of the metal guides 110 and 112 are fixed to the ground metal 102 by welding.

Then, when the contracted portions 70 and 72 of the insulators 62 and 64 are respectively inserted into the metal guides 110 and 112, the contracted portions 70 and 72 of the insulators 62 and 64 sequentially pass through the inside of the metal guides 110 and 112 and the second through holes 98 and 100 of the ground metal 102, and the metal guides 110 and 112 are respectively inserted into the acceptance grooves 66*a* and 68*a* formed in the expanded portions 66 and 68 of the insulators 62 and 64.

The metal guides 110 and 112 inserted into the acceptance grooves 66*a* and 68*a* allow the internal insulators 66' and 68' to have a capacitor value, when the magnetron is operated, and fix the expanded portions 66 and 68 of the insulators 62 and 64, thereby firmly fixing the insulators 62 and 64.

Figure 21:
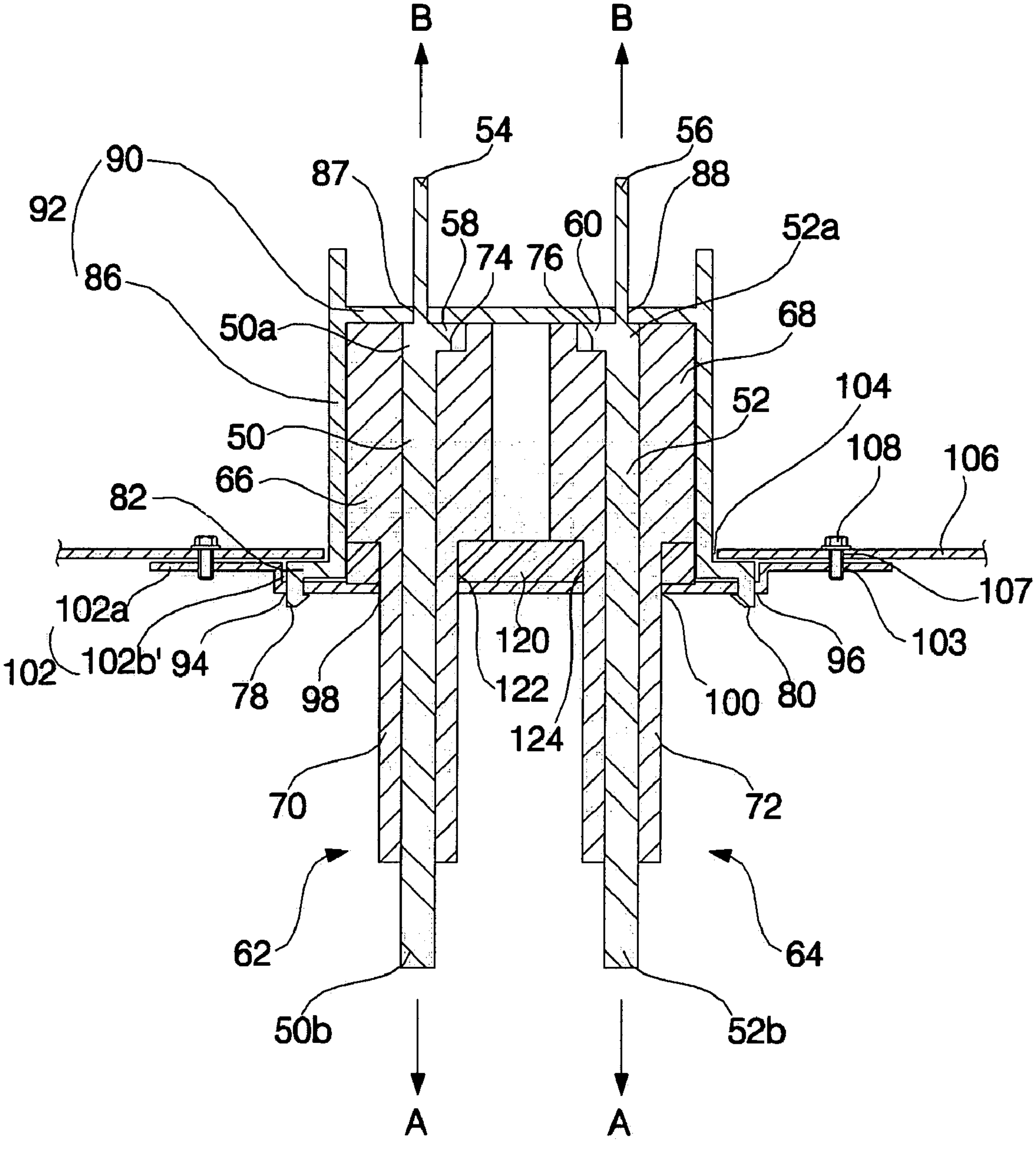
FIG. 21 is a cross-sectional view of a high voltage input apparatus for a magnetron in accordance with a tenth embodiment of the present invention.
Figure 22:
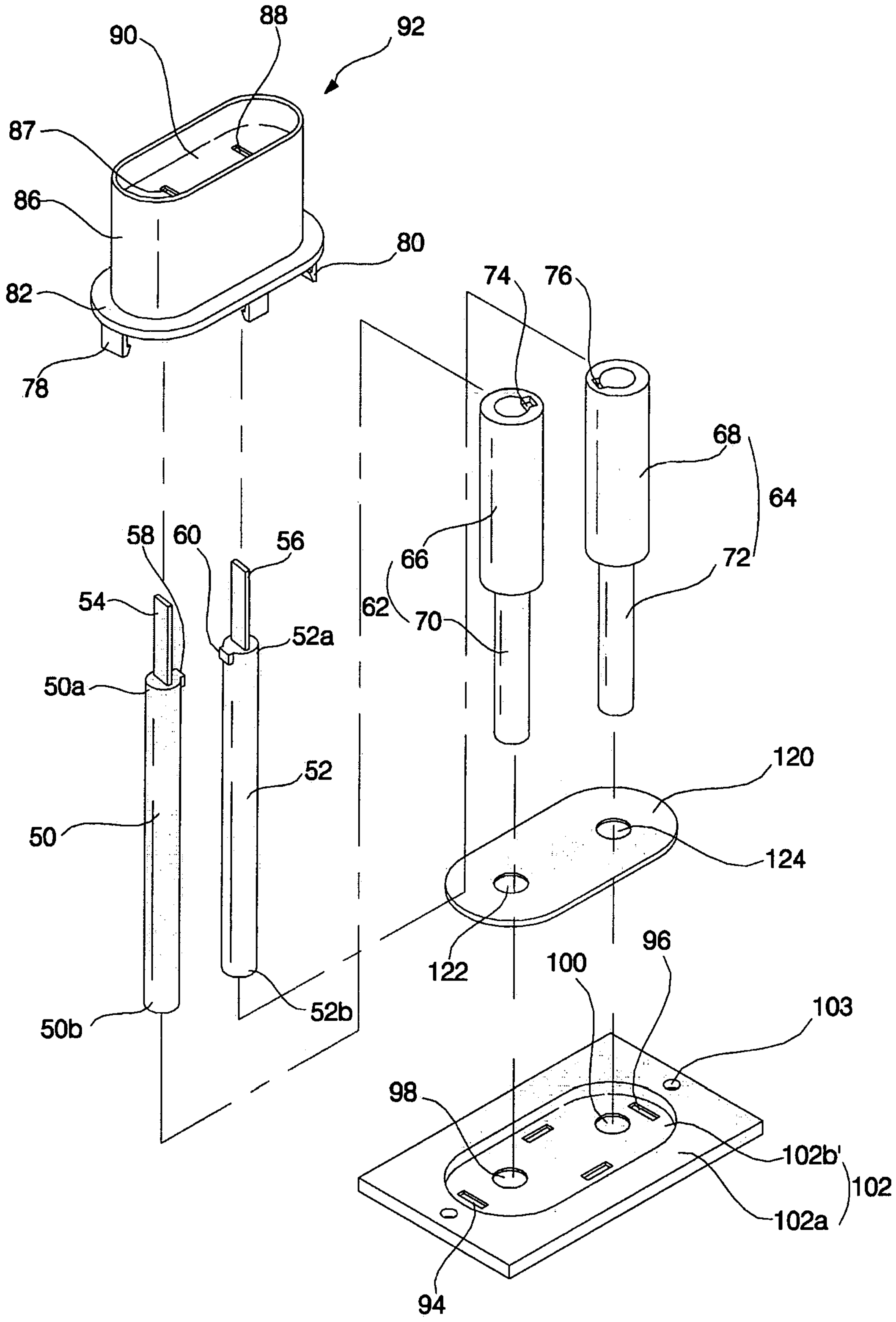
FIG. 22 is an exploded perspective view of the high voltage input apparatus in accordance with the tenth embodiment of the present invention.

FIG. 21 is a cross-sectional view of a high voltage input apparatus for a magnetron in accordance with a tenth embodiment of the present invention, and FIG. 22 is an exploded perspective view of the high voltage input apparatus in accordance with the tenth embodiment of the present invention.

As shown in FIGS. 21 and 22, the high voltage input apparatus in accordance with the tenth embodiment comprises a high-frequency absorber 120 interposed between the expanded portions 66 and 68 of the insulators 62 and 64 and the ground metal 102. Other parts of the high voltage input apparatus in accordance with the tenth embodiment except for the high-frequency absorber 120 are substantially the same as those of the high voltage input apparatus in accordance with any one embodiment of the first to ninth embodiments and are denoted by the same reference numerals even though they are depicted in different drawings, and a detailed description thereof will thus be omitted because it is considered to be unnecessary.

The expanded portions 66 and 68 of the insulators 62 and 64 of the tenth embodiment have a length shorter than those of the expanded portions of the insulators of the first to ninth embodiments by the thickness of the high-frequency absorber 120, and are caught by the high-frequency absorber 120 in the downward direction (A).

The high-frequency absorber 120 is a plate body including through holes 122 and 124, through which the contracted portions 70 and 72 of the insulators 62 and 64 pass.

The high-frequency absorber 120 has a designated shape corresponding to the shape of the inside of the tub unit 86 such that the high-frequency absorber 120 is inserted into the tub unit 86 of the insulating case 92.

The high-frequency absorber 120 is made of ferrite.

Hereinafter, an assembling process of the above-described high voltage input apparatus in accordance with the tenth embodiment will be described in detail.

First, the lead conductors 50 and 52 are respectively inserted into the insulators 62 and 64, and the expanded portions 66 and 68 of the insulators 62 and 64 are inserted into the tub unit 86 of the insulating case 92. Thereafter, when the high-frequency absorber 120 is inserted into the tub unit 86 of the insulating case 92 and the contracted portions 70 and 72 of the insulators 62 and 64 pass through the through holes 122 and 124 of the high-frequency absorber 120, the high-frequency absorber 120 together with the expanded portions 66 and 68 of the insulators 62 and 64 is placed inside the tub unit 86 of the insulating case 92.

Then, when the insulating case 92 is fixed to the ground metal 102 by any one method selected from methods described in the first to fourth embodiments, the expanded portions 66 and 68 of the insulators 62 and 64 and the high-frequency absorber 120 are surrounded by the insulating case 92 and the ground metal 102.

High-frequency waves generated from the high voltage input apparatus of the tenth embodiment through the ground metal 102, when the magnetron is operated, are absorbed/shielded by the high-frequency absorber 120.

Figure 23:
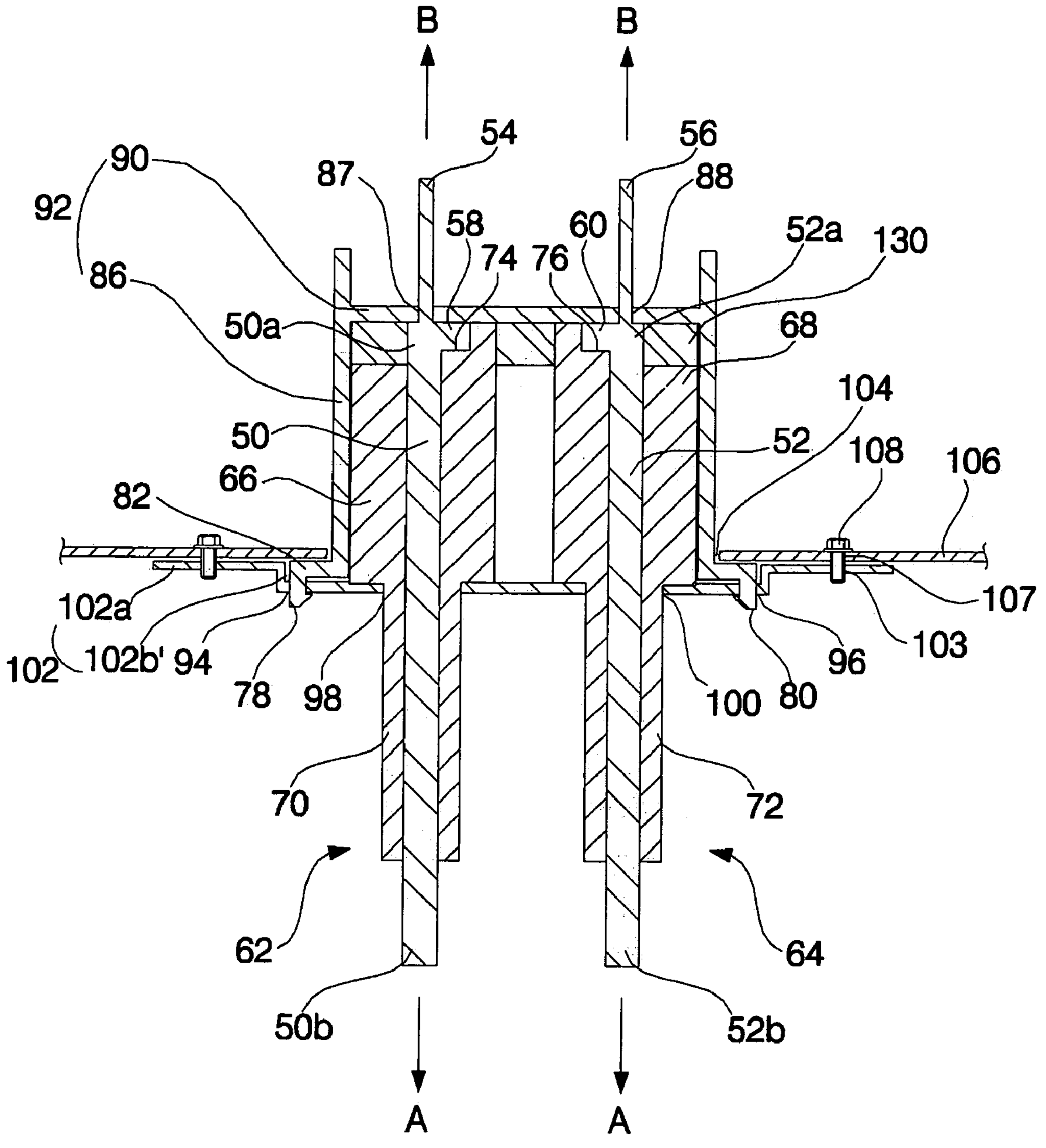
FIG. 23 is a cross-sectional view of a high voltage input apparatus for a magnetron in accordance with an eleventh embodiment of the present invention.
Figure 24:
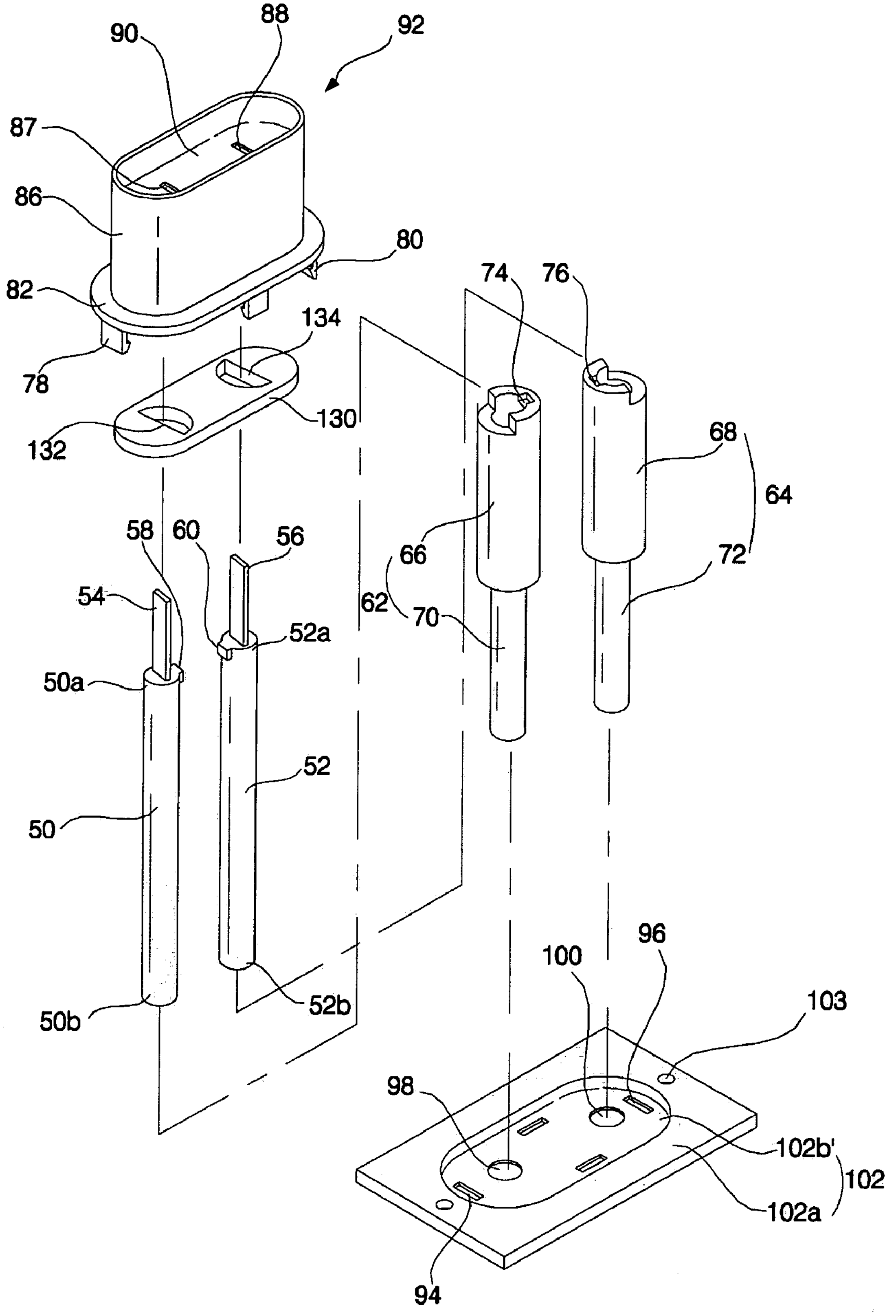
FIG. 24 is an exploded perspective view of the high voltage input apparatus in accordance with the eleventh embodiment of the present invention.

FIG. 23 is a cross-sectional view of a high voltage input apparatus for a magnetron in accordance with an eleventh embodiment of the present invention, and FIG. 24 is an exploded perspective view of the high voltage input apparatus in accordance with the eleventh embodiment of the present invention.

As shown in FIGS. 23 and 24, the high voltage input apparatus in accordance with the eleventh embodiment comprises the grooves 74 and 76 formed in ends of the expanded portions 66 and 68 of the insulators 62 and 64 in a longitudinal direction, and a high-frequency absorber 130 interposed between the expanded portions 66 and 68 of the insulators 62 and 64 and the plate unit 90 of the insulating case 92. Other parts of the high voltage input apparatus in accordance with the eleventh embodiment except for the grooves 74 and 76 and the high-frequency absorber 130 are substantially the same as those of the high voltage input apparatus in accordance with any one embodiment of the first to fourth, ninth, and tenth embodiments and are denoted by the same reference numerals even though they are depicted in different drawings, and a detailed description thereof will thus be omitted because it is considered to be unnecessary.

The expanded portions 66 and 68 of the insulators 62 and 64 of the ninth embodiment have a length shorter than those of the expanded portions of the insulators of the first to fourth, ninth, and tenth embodiments by the thickness of the high-frequency absorber 130, and are caught by the high-frequency absorber 130 in the downward direction (A).

The high-frequency absorber 130 is a plate body including through holes 132 and 134, through which the lead conductors 50 and 52 and the grooves 74 and 76 pass.

The high-frequency absorber 130 has a designated shape corresponding to the shape of the inside of the tub unit 86 such that the high-frequency absorber 130 is inserted into the tub unit 86 of the insulating case 92.

The high-frequency absorber 130 is made of ferrite.

Hereinafter, an assembling process of the above-described high voltage input apparatus in accordance with the eleventh embodiment will be described in detail.

First, when the high-frequency absorber 130 is inserted into the tub unit 86 of the insulating case 92, the high-frequency absorber 130 is caught by the plate unit 90 of the insulating case 92.

Then, the lead conductors 50 and 52 are respectively inserted into the insulators 62 and 64, and the expanded portions 66 and 68 of the insulators 62 and 64 are inserted into the tub unit 86 of the insulating case 92.

Here, the lead taps 54 and 56 of the lead conductors 50 and 52 sequentially pass through the through holes 132 and 134 of the high-frequency absorber 130 and the first through holes 87 and 88 formed through the plate unit 90 of the insulating case 92, and are protruded from the insulating case 92. The ends 50*a* and 52*a* of the lead conductors 50 and 52, through which the lead taps 54 and 56 are protruded, the first protrusions 58 and 60, and the grooves 74 and 76 of the insulators 62 and 64 are placed inside the through holes 132 and 134 of the high-frequency absorber 130, and are caught by one surface of the plate unit 90 of the insulating case 92 in the upward direction (B).

Then, when the insulating case 92 is fixed to the ground metal 102 by any one method selected from methods described in the first to fourth embodiments, the high-frequency absorber 130 and the expanded portions 66 and 68 of the insulators 62 and 64 are surrounded by the insulating case 92 and the ground metal 102. Other steps of the assembling process after this are substantially the same as those of any one embodiment of the first to third embodiments, and a detailed description thereof will thus be omitted because it is considered to be unnecessary.

High-frequency waves generated from the high voltage input apparatus of the ninth embodiment, when the magnetron is operated, are inputted to the insulating case 92 through the ground metal 102, and are absorbed/shielded by the high-frequency absorber 130.

As apparent from the above description, the present invention provides a high voltage input apparatus for a magnetron, in which protrusions formed on lead conductors are caught by insulators and an insulating case, a ground metal is bonded to the insulating case, expanded portions formed on the insulators are caught by the insulating case and the ground metal, thereby causing the lead conductors to be firmly fixed to the insulators and insulating case and preventing the lead conductors from being separated from the insulators and insulating case.

The high voltage input apparatus of the present invention further comprises a tub unit formed on the insulating case and bonded to the ground metal by inserting or using hooks, thereby being easily and firmly assembled.

The high voltage input apparatus of the present invention comprises a second protrusion formed on the insulating case and caught by the ground metal and the filter case, thereby preventing the insulating case from shaking or being separated from the ground metal and the filter case.

The high voltage input apparatus of the present invention further comprises metal guides inserted into the insulators such that parts of the insulators are interposed between the lead conductors, thereby allowing the parts of the insulators to have a designated capacitor value when the magnetron is operated and to constitute components of an LC filter, and allowing the metal guides to fix the insulators for stably supporting the lead conductors and the insulators.

The high voltage input apparatus of the present invention further comprises a high-frequency absorber, thereby minimizing the outflow of high frequency waves generated when the magnetron is operated.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A high voltage input apparatus for a magnetron, comprising:

a pair of lead conductors including lead taps and first protrusions;

insulators hollowed to pass the lead conductors in a longitudinal direction and including expanded portions having an increased thickness and grooves for receiving the first protrusions;

an insulating case including a tub unit accommodating the expanded portions, and a plate unit having first through holes for catching the first protrusions or the expanded portions and passing the lead taps; and a ground metal, bonded to the tub unit, including second through holes for passing portions of the insulators other than the expanded portions.

2. The high voltage input apparatus as set forth in claim 1, wherein the ground metal includes a groove unit, into which the tub unit is inserted by press fit.

3. The high voltage input apparatus as set forth in claim 1, wherein:

hooks are formed on the tub unit of the insulating case; and holes for passing and catching the hooks are formed through the ground metal.

4. The high voltage input apparatus as set forth in claim 1, wherein a high-frequency absorber is interposed between the ground metal and the expanded portions.

5. The high voltage input apparatus as set forth in claim 1, wherein:

the grooves indent ends of the expanded portions in a longitudinal direction; and a high-frequency absorber is interposed between the expanded portions and the plate unit of the insulating case.

6. The high voltage input apparatus as set forth in claim 1, further comprising metal guides respectively inserted into the insulators such that parts of the insulators are interposed between the lead conductors, and connected to the ground metal.

7. The high voltage input apparatus as set forth in claim 6, wherein acceptance grooves, into which the metal guides are inserted, are formed in the expanded portions of the insulators.

8. A high voltage input apparatus for a magnetron, comprising:

a pair of lead conductors including lead taps and first protrusions;

insulators hollowed to pass the lead conductors in a longitudinal direction and including expanded portions having an increased thickness and grooves for receiving the first protrusions;

an insulating case including a tub unit accommodating the expanded portions and having a second protrusion, and a plate unit having first through holes for catching the first protrusions or the expanded portions and passing the lead taps;

a ground metal including second through holes for passing portions of the insulators other than the expanded portions; and a filter case including a third through hole for passing the tub unit of the insulating case, and causing the second protrusion to be caught thereby and the ground metal to be mounted thereon.

9. The high voltage input apparatus as set forth in claim 8, wherein:

the ground metal includes a plate body unit contacting the filter case, and a receipt unit formed in the plate body in a stepwise manner for receiving the second protrusion; and the second protrusion, when the second protrusion is received by the receipt unit, is coplanar with the plate body unit.

10. The high voltage input apparatus as set forth in claim 8, wherein:

hooks are formed on the second protrusion; and holes for passing and catching the hooks are formed through the receipt unit.

11. The high voltage input apparatus as set forth in claim 8, wherein a high-frequency absorber is interposed between the ground metal and the expanded portions.

12. The high voltage input apparatus as set forth in claim 8, wherein:

the grooves indent ends of the expanded portions in a longitudinal direction; and a high-frequency absorber is interposed between the expanded portions and the plate unit of the insulating case.

13. The high voltage input apparatus as set forth in claim 8, further comprising metal guides respectively inserted into the insulators such that parts of the insulators are interposed between the lead conductors, and connected to the ground metal.

14. The high voltage input apparatus as set forth in claim 13, wherein acceptance grooves, into which the metal guides are inserted, are formed in the expanded portions of the insulators.

15. A high voltage input apparatus for a magnetron, comprising:

a pair of lead conductors including lead taps and first protrusions;

a high-frequency absorber including first through holes for respectively passing the lead conductors and grooves for catching the first protrusions;

insulators hollowed to pass the lead conductors in a longitudinal direction and including expanded portions having an increased thickness;

an insulating case including a tub unit accommodating the high-frequency absorber and the expanded portions, and a plate unit having second through holes for catching the high-frequency absorber or the first protrusions and passing the lead taps; and a ground metal including a third through hole, bonded to the tub unit, for passing portions of the insulators other than the expanded portions.

16. The high voltage input apparatus as set forth in claim 15, wherein the ground metal includes a groove unit, into which the tub unit is inserted by press fit.

17. The high voltage input apparatus as set forth in claim 15, wherein:

hooks are formed on the tub unit of the insulating case; and holes for passing and catching the hooks are formed through the ground metal.

18. The high voltage input apparatus as set forth in claim 15, wherein a high-frequency absorber is interposed between the ground metal and the expanded portions.

19. The high voltage input apparatus as set forth in claim 15, wherein:

the second protrusion is formed on the tub unit; and the high voltage input apparatus further comprises a filter case including a fourth through hole for passing the tub unit of the insulating case, and causing the second protrusion to be caught thereby.

20. The high voltage input apparatus as set forth in claim 19, wherein:

the ground metal includes a plate body unit contacting the filter case, and a receipt unit formed in the plate body in a stepwise manner for receiving the second protrusion; and the second protrusion, when the second protrusion is received by the receipt unit, is coplanar with the plate body unit.

21. The high voltage input apparatus as set forth in claim 15, further comprising metal guides respectively inserted into the insulators such that parts of the insulators are interposed between the lead conductors, and connected to the ground metal.

22. The high voltage input apparatus as set forth in claim 21, wherein acceptance grooves, into which the metal guides are inserted, are formed in the expanded portions of the insulators.

* * * * *